US012180646B2

(12) United States Patent
Yu

(10) Patent No.: US 12,180,646 B2
(45) Date of Patent: Dec. 31, 2024

(54) GARMENT STEAMER

(71) Applicant: SHENZHEN PUKAIYU TECHNOLOGY CO., LTD., Guangdong (CN)

(72) Inventor: Yonghua Yu, Guangdong (CN)

(73) Assignee: SHENZHEN PUKAIYU TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/653,969

(22) Filed: May 2, 2024

(65) Prior Publication Data

US 2024/0279867 A1 Aug. 22, 2024

Related U.S. Application Data

(63) Continuation-in-part of application No. 18/647,091, filed on Apr. 26, 2024, which is a continuation-in-part of application No. 18/119,298, filed on Mar. 9, 2023, now Pat. No. 12,000,083, which is a continuation-in-part of application No. 17/476,497, filed on Sep. 16, 2021, now abandoned.

(30) Foreign Application Priority Data

Apr. 26, 2024 (CN) ......................... 202420902525.3

(51) Int. Cl.

| | |
|---|---|
| ***D06F 75/26*** | (2006.01) |
| ***D06F 75/18*** | (2006.01) |
| ***D06F 87/00*** | (2006.01) |
| ***H05B 1/02*** | (2006.01) |

(52) U.S. Cl.
CPC .............. *D06F 75/26* (2013.01); *D06F 75/18* (2013.01); *D06F 87/00* (2013.01); *H05B 1/0272* (2013.01)

(58) Field of Classification Search
None
See application file for complete search history.

(56) References Cited

U.S. PATENT DOCUMENTS

2002/0130123 A1* 9/2002 Prager ..................... D06F 75/26 219/257
2010/0166396 A1* 7/2010 Xu .......................... D06F 73/00 392/394

OTHER PUBLICATIONS

CN 116610171 A translation, Control Method, Device, Storage Medium and System of Ironing Device for Fast Preheating, He (Year: 2023).*

* cited by examiner

*Primary Examiner* — Cristi J Tate-Sims

(57) ABSTRACT

A garment steamer includes: a water tank, configured to store water, an evaporator assembly, connected to the water tank and configured to generate steam; a water pump, configured to transfer water from the water tank to the evaporator assembly; a power input end, configured to input power to the garment steamer, a first switch, connected between the power input end and the evaporator assembly; and a microcontroller, connected to the first switch and configured to control a conduction time length of the first switch.

15 Claims, 20 Drawing Sheets

GARMENT STEAMER

CROSS-REFERENCE TO RELATED APPLICATIONS

This application is a continuation-in-part of: the U.S. application Ser. No. 18/119,298, filed on Mar. 9, 2023, which is a continuation-in-part of U.S. application Ser. No. 17/476,497, filed Sep. 16, 2021; and the U.S. application Ser. No. 18/647,091, filed on Apr. 26, 2024. The present application further claims the priority of the Chinese patent application No. 202420902525.3, filed on Apr. 26, 2024. The disclosure of which is hereby incorporated by reference in their entireties.

FIELD

The present disclosure relates to household appliances, and in particular to a garment steamer.

BACKGROUND

A garment steamer is a household appliance in which an evaporator is arranged to generate steam. The evaporator is designed to operate at 110V commercial voltage or 220V commercial voltage. When the 110V garment steamer is connected to the 220V commercial power source, there is a possibility that a fire is generated and, as such, the user is exposed to great danger. On the other hand, when the 220V garment steamer is connected to the 110V commercial power source, the garment steamer cannot perform a desired intrinsic function thereof.

SUMMARY

The present disclosure provides a garment steamer, including: a water tank, configured to store water; an evaporator assembly, connected to the water tank and configured to generate steam; a water pump, configured to transfer water from the water tank to the evaporator assembly; a power input end, configured to input power to the garment steamer; a first switch, connected between the power input end and the evaporator assembly; and a microcontroller, connected to the first switch and configured to control a conduction time length of the first switch.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

The realization of the aim, functional characteristics, advantages of the present disclosure are further described specifically with reference to the accompanying drawings and embodiments.

Figure 19:
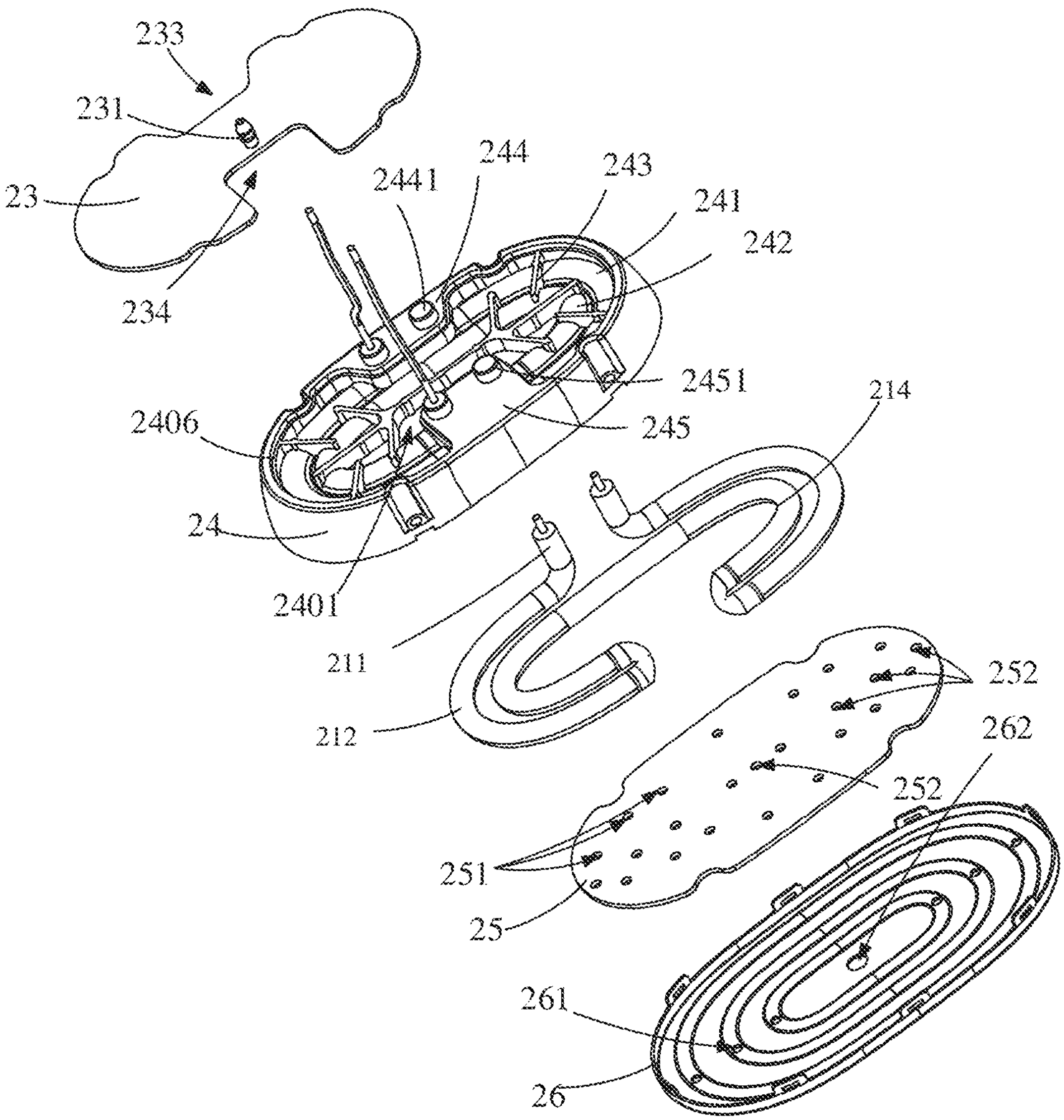

FIG. 19 is an exploded view of the evaporator assembly according to another embodiment of the present disclosure.

Figure 20:
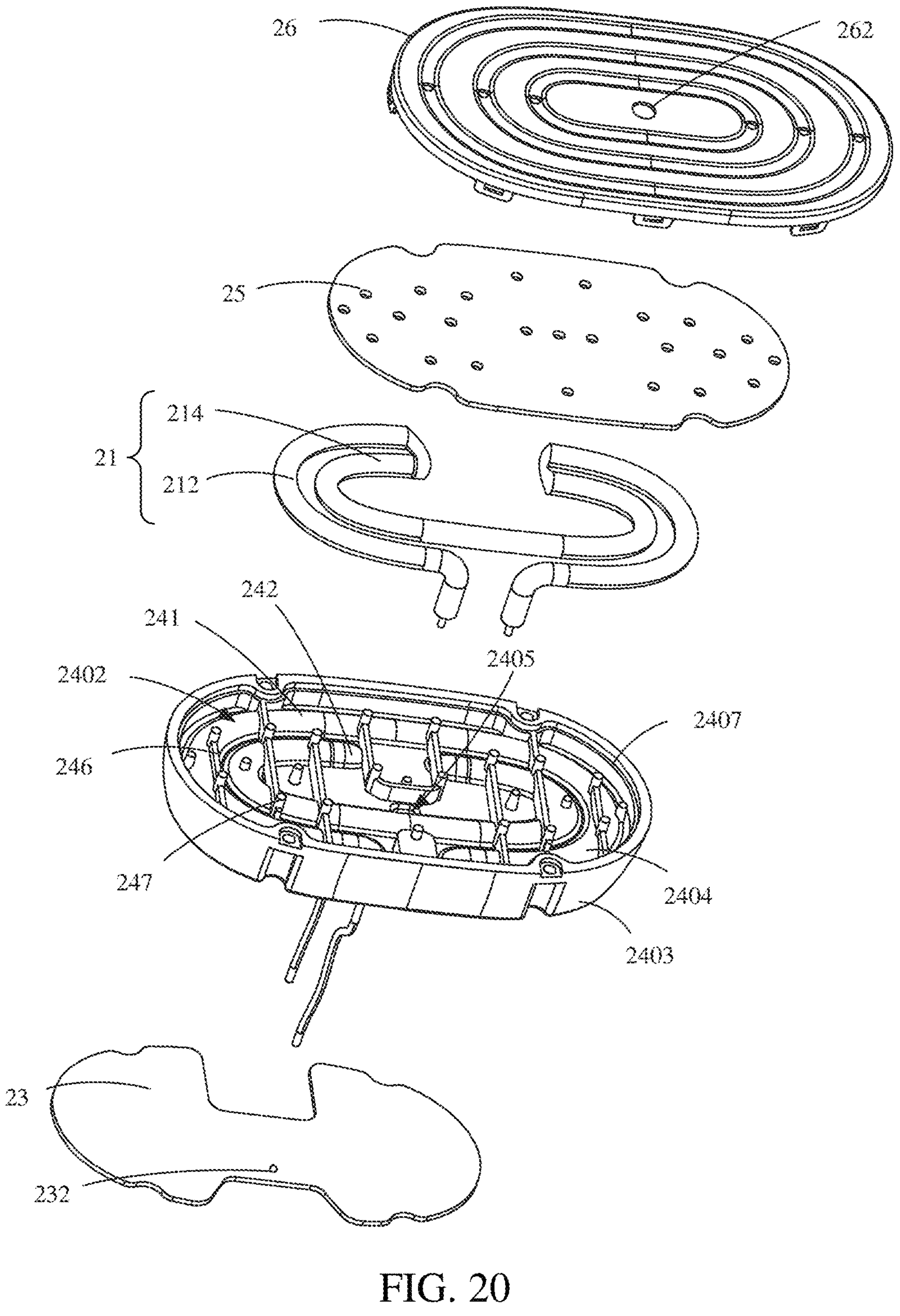

FIG. 20 is an exploded view of the evaporator assembly according to another embodiment of the present disclosure.

Figure 21:
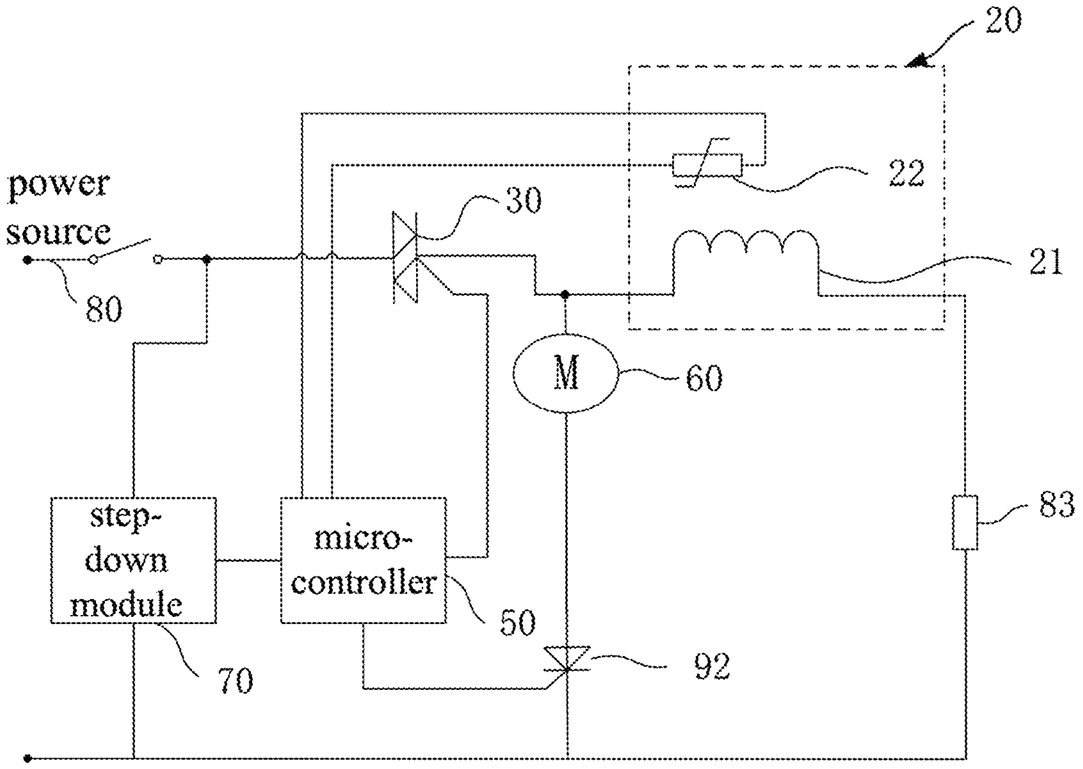

FIG. 21 is a circuit diagram of the garment steamer according to another embodiment of the present disclosure.

Figure 22:
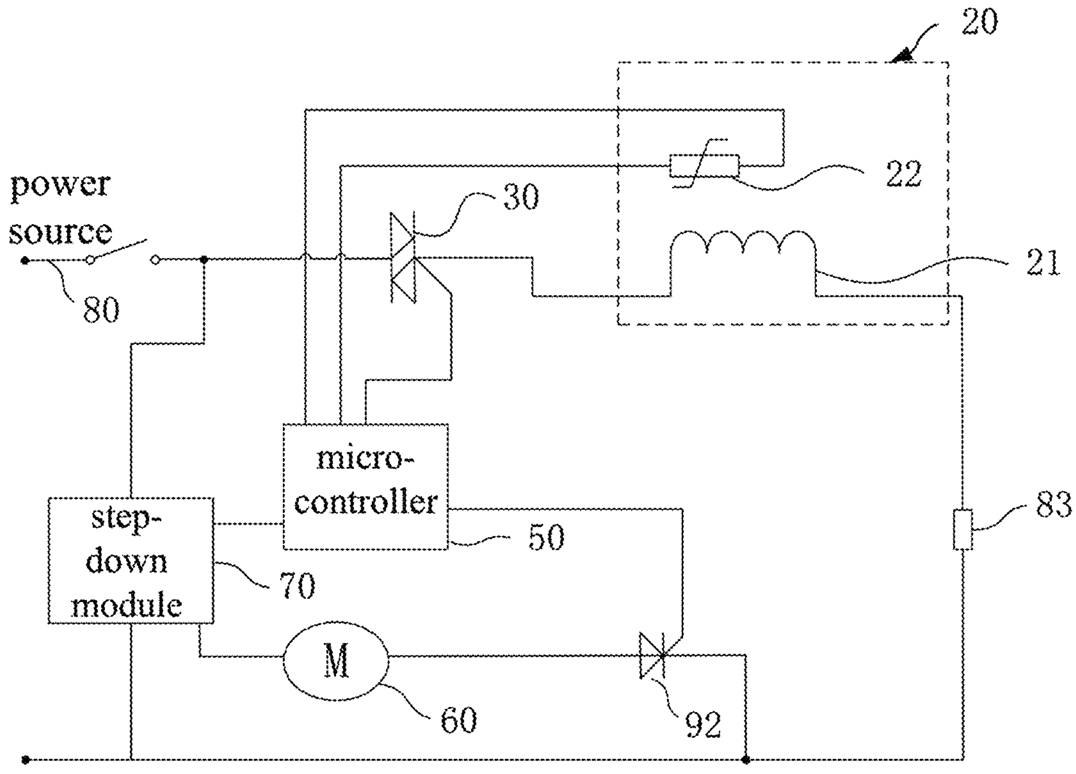

FIG. 22 is another circuit diagram of the garment steamer according to another embodiment of the present disclosure.

DETAILED DESCRIPTION

The technical solutions of the embodiments of the present disclosure will be clearly and completely described in the following with reference to the accompanying drawings. It is obvious that the embodiments to be described are only a part rather than all of the embodiments of the present disclosure. All other embodiments obtained by persons skilled in the art based on the embodiments of the present disclosure without creative efforts shall fall within the protection scope of the present disclosure.

Referring to FIGS. 1-13, the present disclosure provides a garment steamer 100 according to an embodiment, the garment steamer 100 may a handheld garment steamer.

The garment steamer 100 includes a housing 10, a water tank 14 configured to store water, an evaporator assembly 20 communicated with the water tank 14 and configured to generate steam, a relay 30 configured to connect the evaporator assembly 20 to a power supply. The power supply supplies AC voltage of 110-220V. The evaporator assembly 20 includes a first heating member 21 and a second heating member 22, a resistance of the first heating member 21 meets 110V power supply, a resistance of the second heating member 22 meets 220V power supply, and the relay 30 connects 110V power supply to the first heating member 21 or connects 220V power supply to the second heating member 22 automatically. In this way, the garment steamer 100 is capable of safely operating while generating a constant output without requiring a separate user operation even when the garment steamer 100 is connected to the power supply either 100V or 220V.

The relay 30 includes a first switch 31 normally connected with the first heating member 21. When the garment steamer 100 is connected with 110V power supply, the first switch 31 remains connecting with the first heating member 21; and when the garment steamer 100 is connected with 220V power supply, the relay 30 generates a first magnetic force capable of moving the first switch 31 to connect with the second heating member 22. In one embodiment, the relay 30 is an AC 220V relay, and the first switch 31 of the relay 30 is normally connected with the first heating member 21, when the garment steamer 100 is connected to the power supply with a voltage less than 176V, the magnetic force generated by the relay 30 is too small to move and connect with the second heating member 22, and the first switch 31 remains connecting with the first heating member 21; when the garment steamer 100 is connected to the power supply with a voltage no less than 176V, the magnetic force generated by the relay 30 is capable of moving the first switch 31 to connect with the second heating member 22 within about 20 ms. The first switch 31 moves in such a short time to disconnect with the first heating member 21, so the first heating member 21 may not been damaged.

The first heating member 21 and the second heating member 22 are both made of metal, such as aluminium, aluminium alloy, copper, copper alloy, magnesium oxide, or the like. The first heating member 21 and the second heating member 22 are two independent components, and the first heating member 21 and the second heating member 22 may be cast in the evaporation chamber 24. The first heating member 21 is a tubular heating coil, and the second heating member 22 is a tubular heating coil. The first heating member 21 surrounds the second heating member 22.

The evaporator assembly 20 further includes an evaporation chamber 24 communicated with the water tank 14, a first cover 23 configured to cover a first side of the evaporation chamber 24, a first receiving member 241 arranged in the evaporation chamber 24 and configured to receive the first heating member 21, a second receiving member 242 arranged in the evaporation chamber 24 and configured to receive the second heating member 22, a second cover 25 configured to cover a second side of the evaporation chamber 24, and a back cover 27 connected with the evaporation chamber 24. The first heating member 21 and the second heating member 22 may be cast in the evaporation chamber 24, and sealed in the first receiving member 241 and the second receiving member 242 respectively.

The first heating member 21 and the second heating member 22 are received in the evaporation chamber 24 to heat water in the evaporation chamber 24. The evaporation chamber 24, the first receiving member 241, the second receiving member 242, the first cover 23 and the back cover 27 cooperatively define a first sub evaporation chamber 2401. The evaporation chamber 24, the first receiving member 241, the second receiving member 242, the second cover 25 and the back cover 27 cooperatively define a second sub evaporation chamber 2402 communicated with the first sub evaporation chamber 2401.

The first cover 23 includes an inlet portion 231 communicated with the water tank 14, and a first through hole 232 configured to communicate the inlet portion 231 with the first sub evaporation chamber 2401. The second cover 25 defines a plurality of second through holes 251, and a plurality of third through holes 252 communicated with the second sub evaporation chamber 2402, the steam generated in the evaporation chamber 24 flows out through the third through holes 252. The plurality of third through holes 252 are arranged in a line, and the second through holes 251 surround the third through holes 252.

The evaporation chamber 24 includes a side wall 2403 and a middle wall 2404, the middle wall 2404 defines at least one third through hole 2405 for communicating the first sub evaporation chamber 2401 with the second sub evaporation chamber 2402. The third through hole 2405 may be defined in a middle portion of the middle wall 2404. The side wall 2403, the middle wall 2404, the first receiving member 241, the second receiving member 242, and the first cover 23 cooperatively define the first sub evaporation chamber 2401. The side wall 2403, the middle wall 2404, the first receiving member 241, the second receiving member 242, and the second cover 25 cooperatively define the second sub evaporation chamber 2402. In one embodiment, the first receiving member 241 and the second receiving member 242 are protruded from two sides of the middle wall 2404.

The first sub evaporation chamber 2401 is provided with a plurality of first water guiding portions 243, the first water guiding portions 243 cooperatively form at least one first water flowing channel. The second sub evaporation chamber 2402 is also provided with a plurality of second water guiding portions 246, the second water guiding portions 246 cooperatively form at least one second water flowing channel. In one embodiment, each of the first water flowing channel and the second water flowing channel is symmetrical arranged.

The side wall 2403 is protruded with a first connecting plate 244 and a second connecting plate 245, the first connecting plate 244 and the second connecting plate 245 extend towards each other. The first connecting plate 244 is provided with two first connecting portions 2441, the second connecting plate 245 is provided with two second connecting portions 2451, the first heating member 21 includes two connecting ends 211, and the second heating member 22 includes two connecting ends 221 electronically connected with the relay 30, the connecting ends 211 are received in the first connecting portions 2441 and electronically connected with the relay 30, the connecting ends 221 are received in the second connecting portions 2451 and electronically connected with the relay 30.

In one embodiment, a length of the first heating member 21 is larger than that of the second heating member 22. For this reason, the first heating member 21 with low resistance can also have a high heating efficiency. It should be understood that, the length of the second heating member 22 can also be set to be larger than that of the first heating member 21.

The first heating member 21 is substantially ring shaped, elliptical shaped, square shaped, hexagonal shaped, triangular shaped or irregular shaped. The two connecting ends 211 of the first heating member 21 are separated from each other and extended towards the first connecting portions 2441. The second heating member 22 is substantially ring shaped, elliptical shaped, square shaped, hexagonal shaped, triangular shaped or irregular shaped. The two connecting ends 221 of the second heating member 22 are also separated from each other and extended towards the second connecting portions 2451. The first heating member 21 surrounds the second heating member 22, and the two connecting ends 221 are arranged at a side of the first heating member 21 away from the connecting ends 211, for preventing a short-circuit caused by a faulty connection between the wires and increasing a space for connecting the wires with the ends.

The side wall 2403 includes a first step 2406 and a second step 2407 which are both arranged along an inner surface of the side wall 2403. The first cover 23 is arranged on the first step 2406 and the second cover 25 is arrange on the second step 2407. The first cover 23 defines two notches 233 and 234, the first connecting plate 244 and the second connecting plate 245 are received in the notches 233 and 234, respectively.

The evaporation assembly 20 further includes a plurality of positioning rods 247 which are arranged on the second water guiding portions 246, the middle wall 2404, the first receiving members 241 and the second receiving members 242. In one embodiment, the positioning rods 247 are received in the second through holes 251 of the second cover 25, and at least one of the positioning rods 247 does not completely occupy the corresponding second through hole 251, that is, a gap is defined between an outer wall of the at least one of the positioning rods 247 and an inner wall of the corresponding second through hole 251, so the steam generated in the first and second sub evaporation chambers can flow through the second through hole 251. In another embodiment, the positioning rods 247 are received in the second through holes 251 of the second cover 25, and the positioning rods 247 completely occupy the second through holes 251. In a further embodiment, some positioning rods 247 are received in the second through holes 251, and some positioning rods 247 are received in the third through holes 252, the second through holes 251 may be completely filled by the positioning rods 247 or partially filled by the positioning rods 247, the third through holes 252 are partially filled by the positioning rods 247, and the steam generated in the first and second sub evaporation chambers can flow through the third through holes 252.

The plurality of third through holes 252 are arranged in a line, and the second through holes 251 surround the third through holes 252 or arranged on two sides of the third through holes 252 respectively. The evaporation assembly 20 further includes an outer cover 26 which defines a plurality of first outlets 261 and a second outlet 262. In one embodiment, the first outlet 261 has a diameter of about 10-20 mm, and the second outlet 262 has a diameter of about 40-80 mm. Several third through holes 252 in a middle portion of the second cover 25 correspond to the second outlet 262, and the remaining third through holes 252 correspond to their respective the first outlets 261. In one embodiment, the third through hole 252 has the same diameter as the second through hole 251, the positioning rods 247 include a plurality of first positioning rods and a plurality of second positioning rod, the first positioning rods are received in their respective second through holes 251 to connect the cover 25 with the outer cover 26, a size of the first positioning rod is equal to that of the second through hole 251, or slightly smaller than that of the second through hole 251, the second through holes 251 may be completely filled by their respective first positioning rods, or a first small gap is formed between the first positioning rod and an inner wall of the second through hole 251 and the steam generated in the first and second sub evaporation chambers can flow through the first small gaps. A size of the second positioning rod is smaller than that of the third through hole 252, the second positioning rod are partially received in their respective third through holes 252, a second gap is formed between the first positioning rod and an inner wall of the second through hole 251, and the steam generated in the first and second sub evaporation chambers can flow through the second gaps.

The garment steamer 100 further includes a single chip unit 50 (also named microcontroller) and a water pump 60 electronically connected with the single chip unit 50. The water pump 60 can pump water in the water tank 14 into the evaporation chamber 24. The water pump 60 is equipped with a motor, the single chip unit 50 can control a water pump speed of the water pump 60 to adjust a steam output amount. The water pump 60 has a relative lower power, about 1-10 w, and the low power water pump 60 is small in size and suitable for the garment steamer 100. The garment steamer 100 further includes a step-down module 70 electronically connected with the single chip unit 50, the step-down module 70 is configured to lower an input voltage (220V) to an operating voltage suitable for the low power water pump 60. The step-down module 70 may be an AC-DC step-down transformer. In one embodiment, the step-down module 70 may be integrated in the PCB board 40. In another embodiment, the step-down module 70 and the PCB board 40 are two independent components, the step-down module 70 is arranged on and electrically connected with the PCB board.

The high power water pump is usually large in size and may occupy a larger inner space of the garment steamer 100, and the high power water pump may be operated well at 220V power supply. The low power water pump 60 is small in size and can be operated well at 110V power supply. When the garment steamer 100 is provided with 220V power supply, the step-down module 70 lowers the input voltage (220V) to the operating voltage suitable for the water pump 60. In this way, the water pump 60 can work well when the garment steamer 100 is connected to the power supply either 100V or 220V without increasing the size of the garment steamer 100.

The garment steamer 100 further includes a first connecting pipe 143 configured to communicate the water tank 14 with the water pump 60, and a second connecting pipe 144 configured to communicate the water pump 60 with the evaporation assembly 20. The water tank 14 includes a first portion 141 and a second portion 142, the first portion 141 encloses with the second portion 142 to defines a space for storing the water. The first connecting pipe 143 extends into the space. The water pump 60 is arranged above the water tank 14, and the first connecting pipe 143 and the second connecting pipe 144 are connected with two sides of the water pump 60 respectively.

The garment steamer 100 further includes a first temperature controller 81 and a second temperature controller 82. The first temperature controller 81 is configured to detect a first temperature of the evaporator assembly 20 and disconnect the evaporator assembly 20 from the power supply when the first temperature exceeds a first preset temperature. The second temperature controller 82 is configured to detect a second temperature of the evaporator assembly 20 and control the water pump 60 to pump the water in the water tank 14 into the evaporator assembly 20 when the second temperature reaches a second preset temperature. The back cover 27 defines a mounting portion 271 for mounting the first temperature controller 81 and the second temperature controller 82, the second connecting pipe 144 passes through the mounting portion 271 to communicate with evaporation chamber 24. In one embodiment, the first temperature controller 81 has a normally-closed switch, and the second temperature controller 82 has a normally-open switch.

The garment steamer 100 further includes a housing 10, a switch 124 arranged on the housing 10, a display panel 126 arranged on the housing 10, at least one button 127 arranged on the display panel 126, a PCB board 40, a fuse 83 and a plug 123 electronically connected with the PCB board 40. The water tank 14 is partially exposed from the housing 10.

The housing 10 includes a first sub housing 11, a second sub housing 12 connected with the first sub housing 11, and a third sub housing 13 for receiving the relay 30, the PCB board 40, the single chip unit 50 and a part of the evaporation assembly 20.

The first sub housing 11 includes a support portion 111 for supporting the water tank 14, a receiving portion 112 for partially receiving the water tank 14, and a first mounting portion 113. The second sub housing 12 defines a fourth through hole 1202 from which the switch 124 exposes, and a fifth through hole 1203 through which a cable 122 passes, and the plug 123 is connected with the cable 122. The garment steamer 100 is connected with the power supply by the cable 122 and the plug 123. The second sub housing 12 further includes a second mounting portion 1204, the water pump 60 is mounted on the first mounting portion 113 and the second mounting portion 1204.

The third sub housing 13 defines a first receiving cavity 130, a sixth through hole 131, a second receiving space 132 communicated with the first receiving cavity 130 by the sixth through hole 131, a seventh through hole 133, and a channel 134 communicated with the second receiving space 132 by the seventh through hole 133. The first receiving cavity 130 is configured to receive a part of the evaporation assembly 20. The second receiving space 132 is configured to receive the relay 30, the PCB board 40 and the single chip unit 50. The second connecting pipe 144 passes through the channel 134, the second receiving space 132, and the first receiving cavity 130 to communicate with the evaporation chamber 24.

Figure 1:
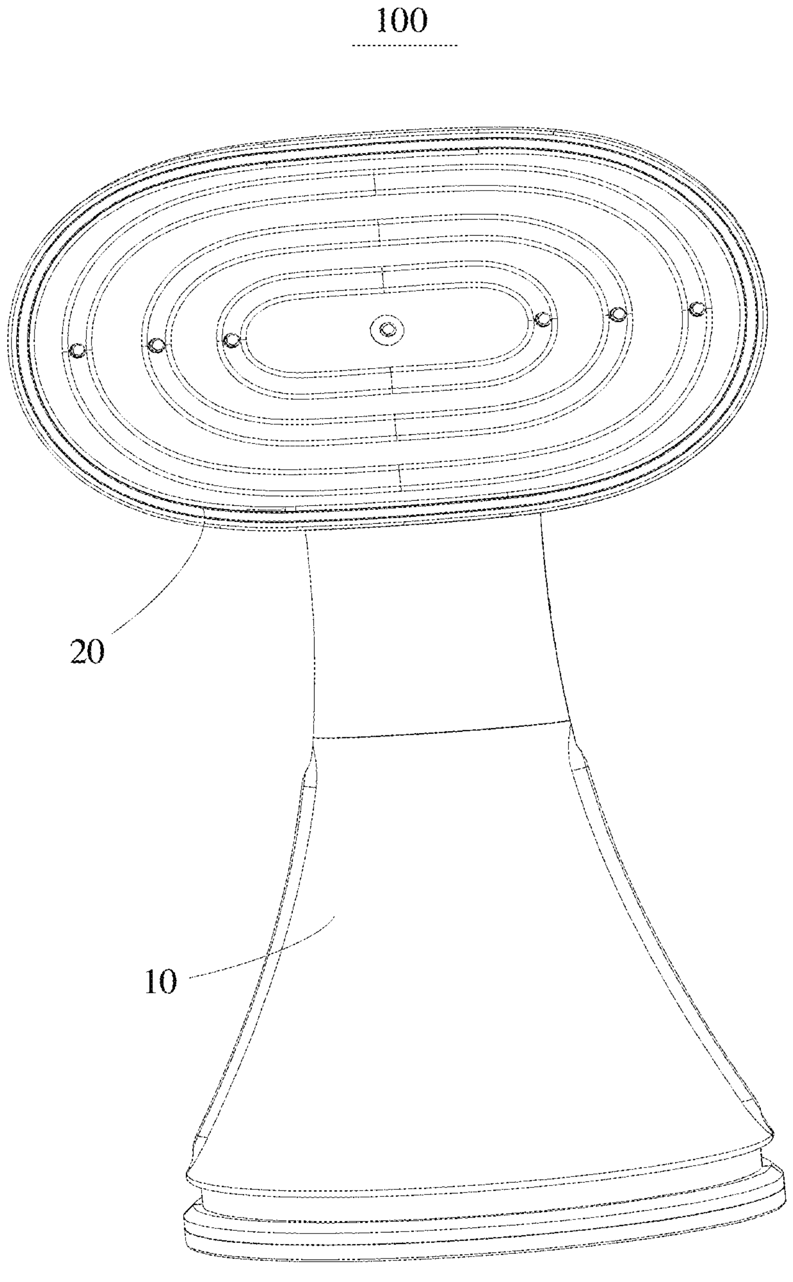
FIG. 1 is a structure diagram of a garment steamer according to an embodiment of the present disclosure.
Figure 2:
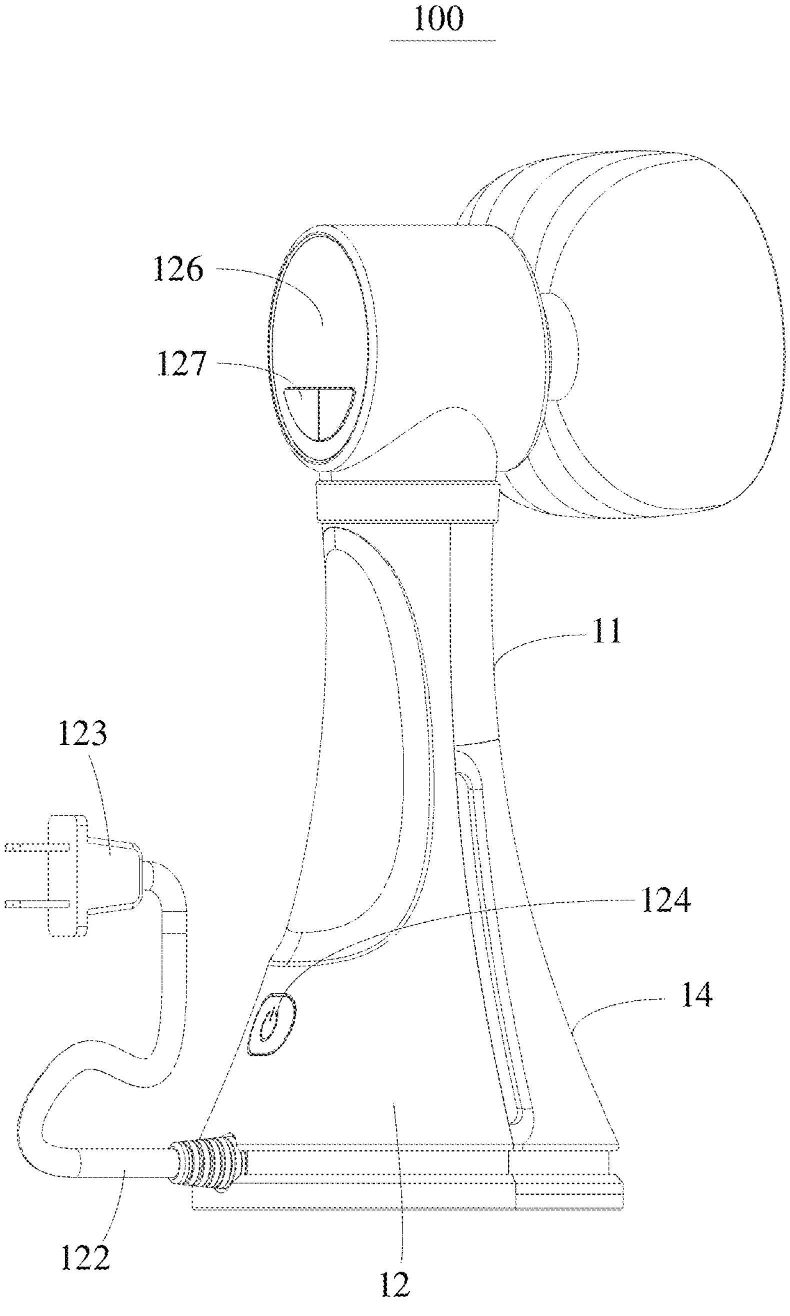
FIG. 2 is another structure diagram of the garment steamer of FIG. 1.
Figure 3:
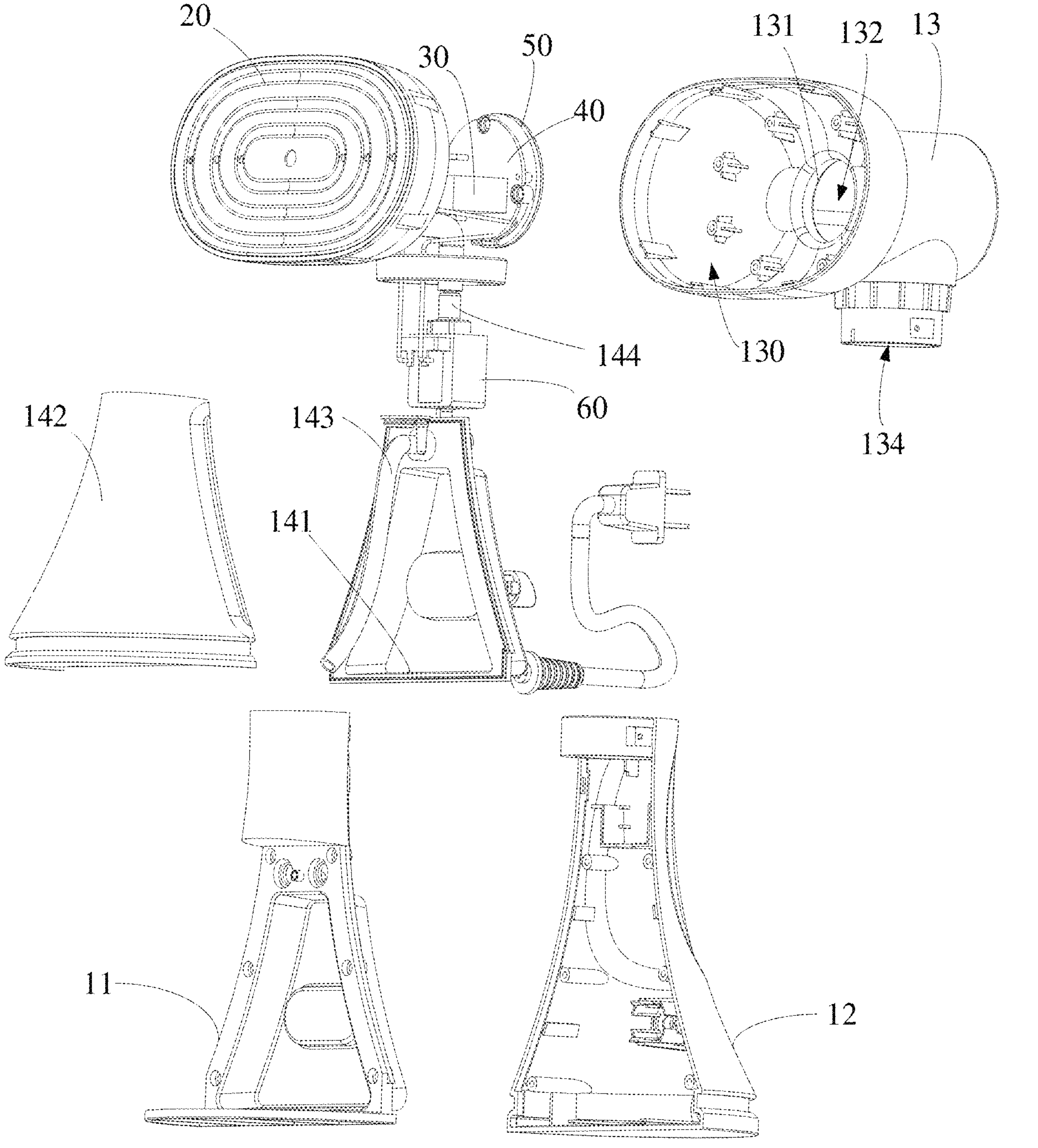
FIG. 3 is an exploded diagram of the garment steamer of FIG. 1.
Figure 4:
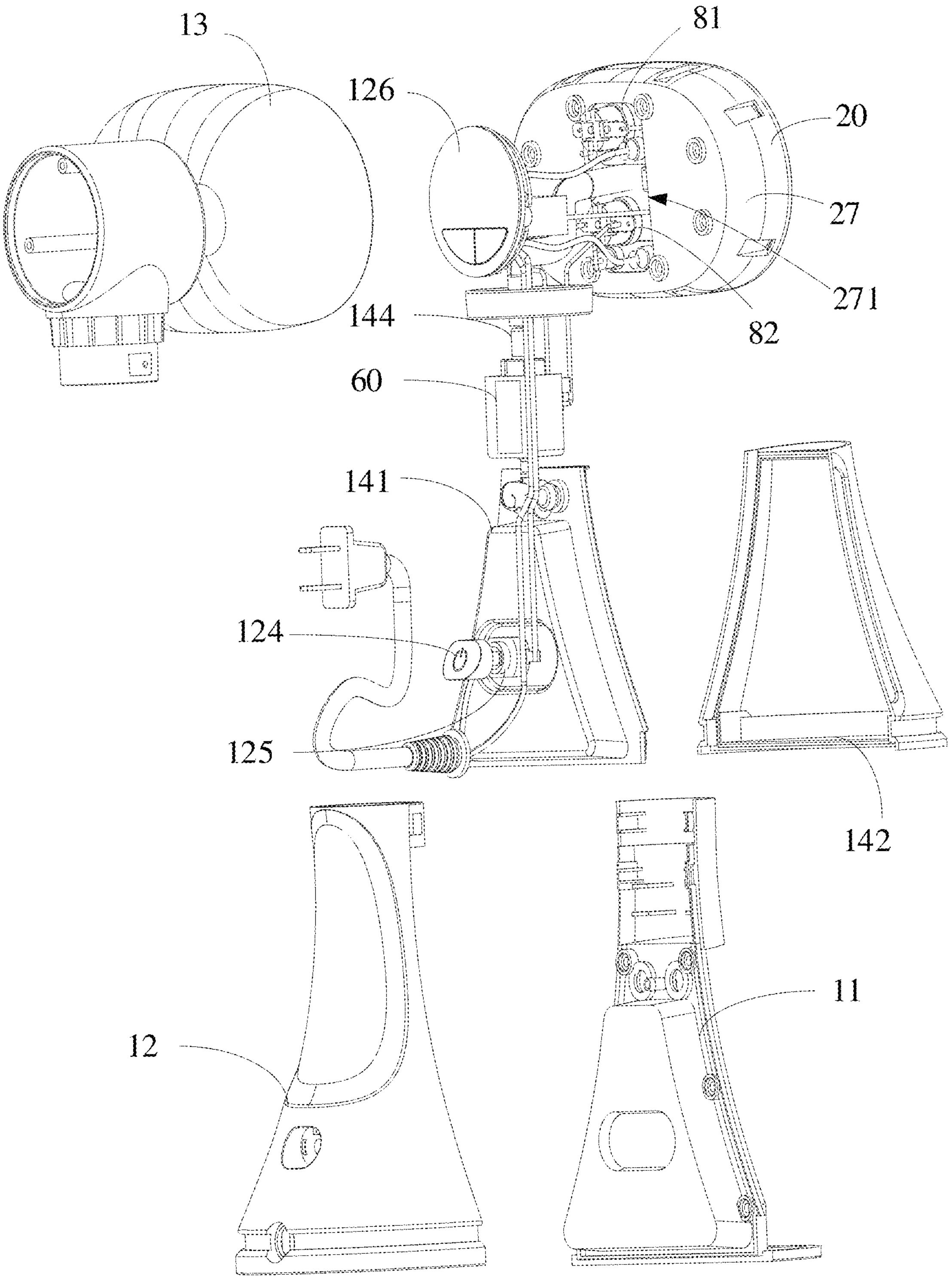
FIG. 4 is another exploded diagram of the garment steamer of FIG. 1.
Figure 5:
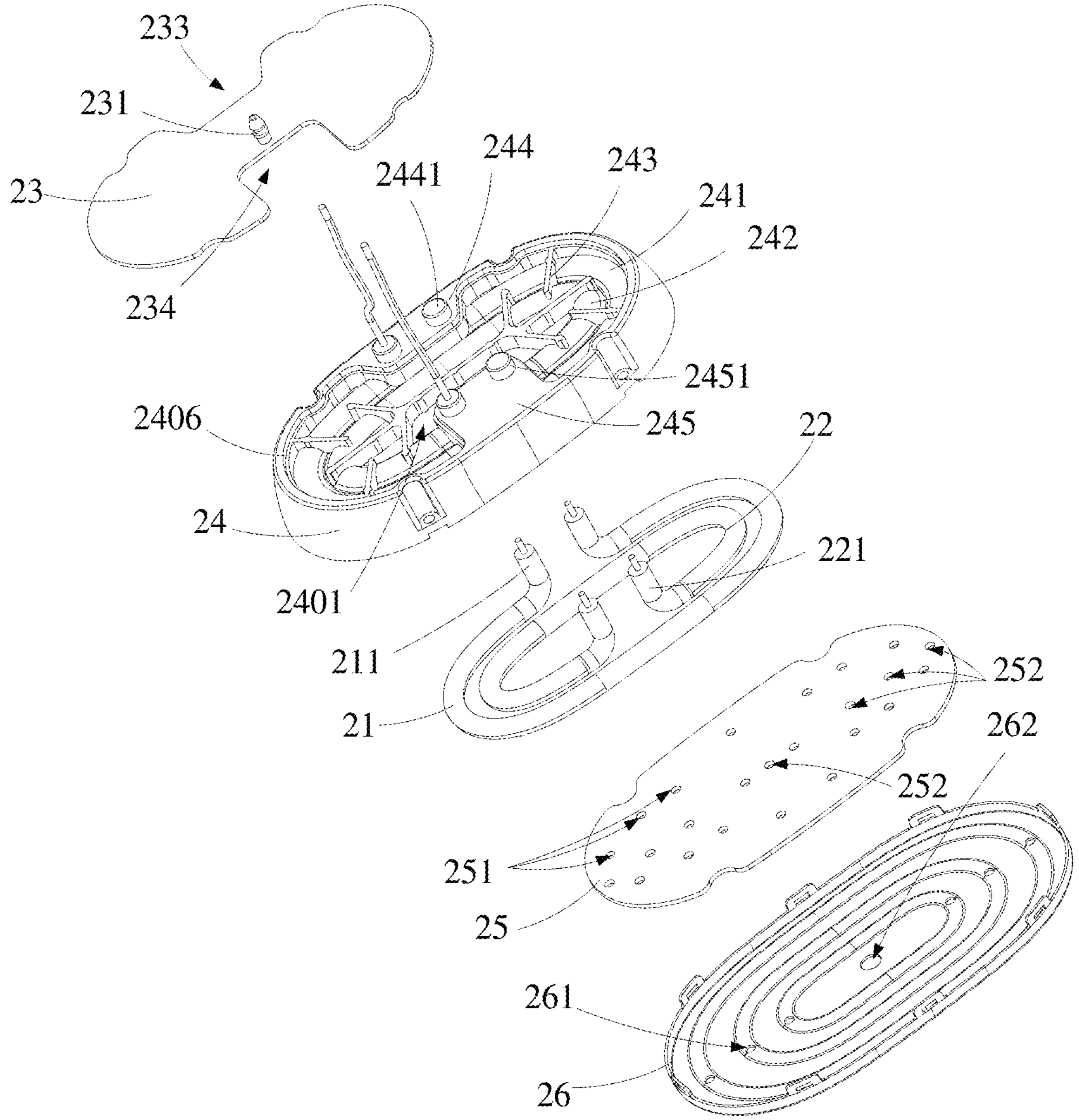
FIG. 5 is an exploded diagram of a part of an evaporator assembly of FIG. 3.
Figure 6:
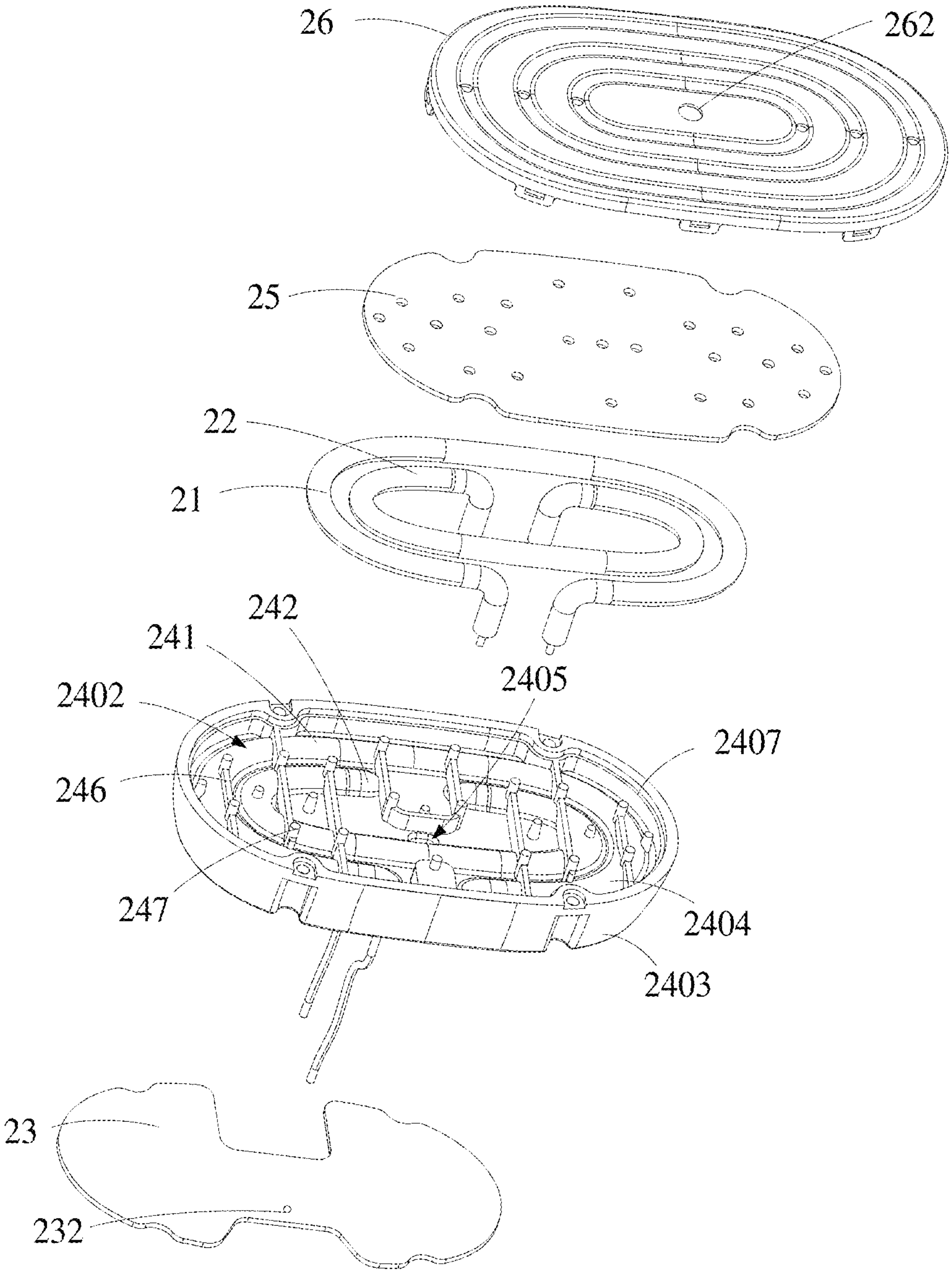
FIG. 6 is another exploded diagram of a part of the evaporator assembly of FIG. 3.
Figure 7:
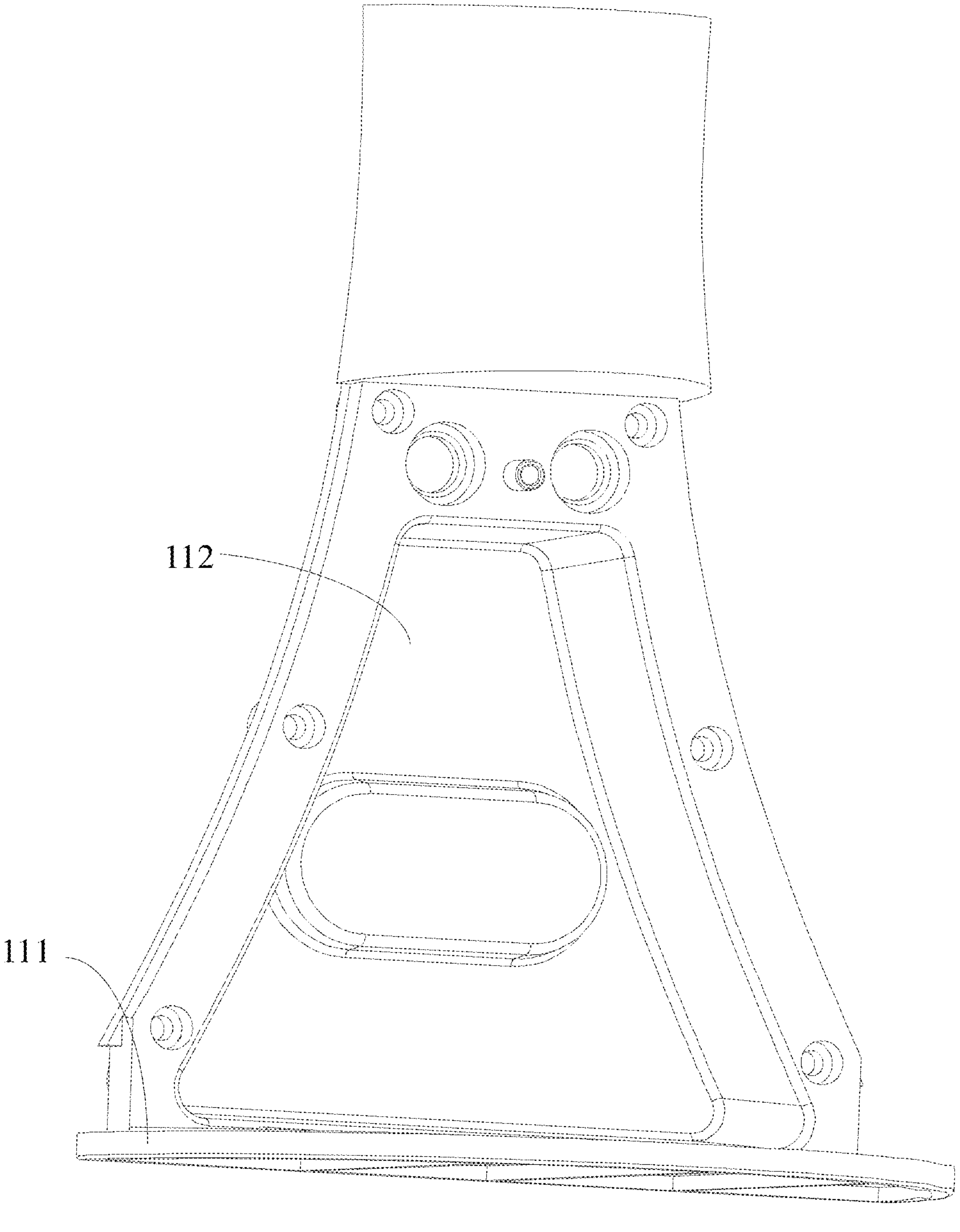
FIG. 7 is a structure diagram of a first sub housing of FIG. 3.
Figure 8:
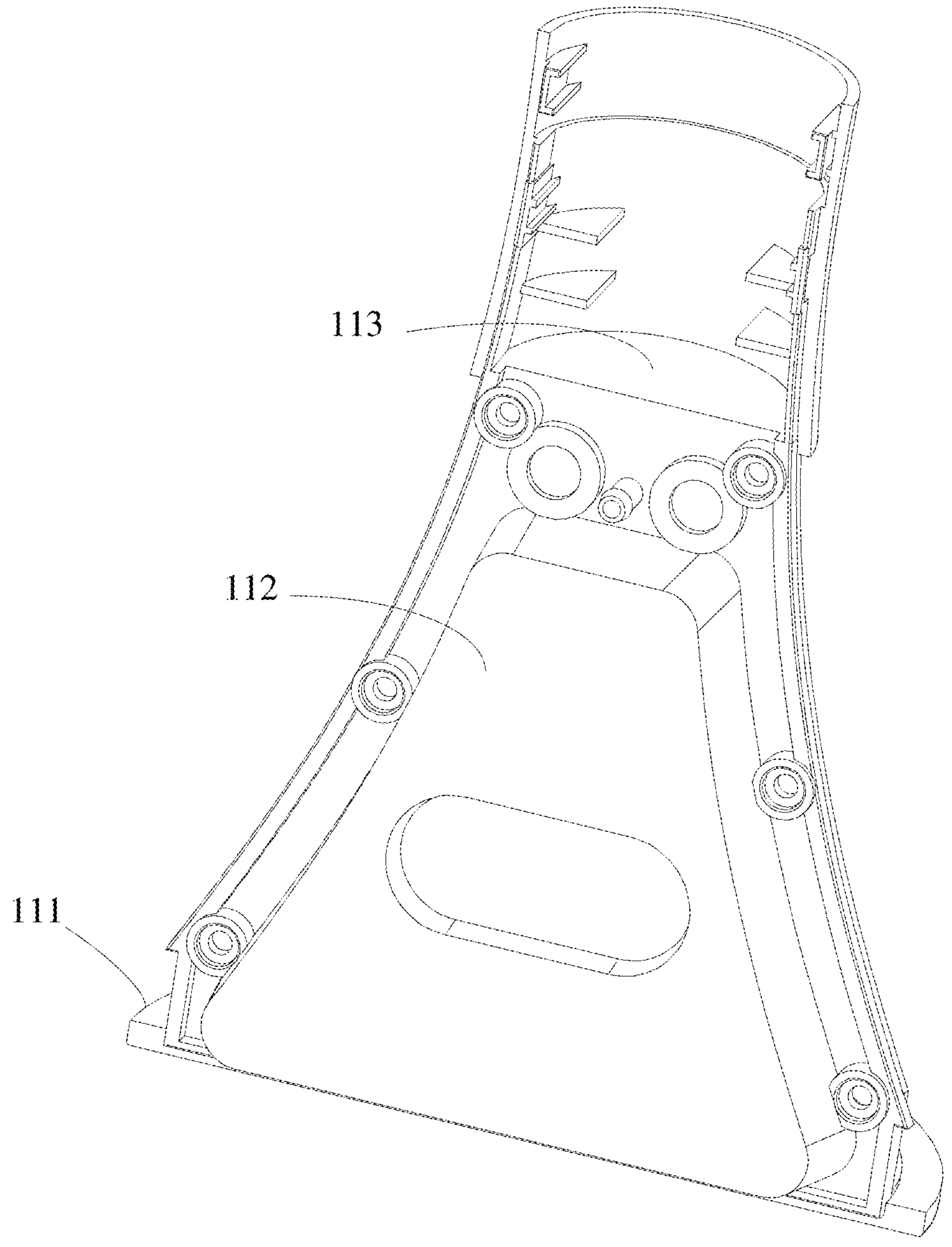
FIG. 8 is another structure diagram of the first sub housing of FIG. 3.
Figure 9:
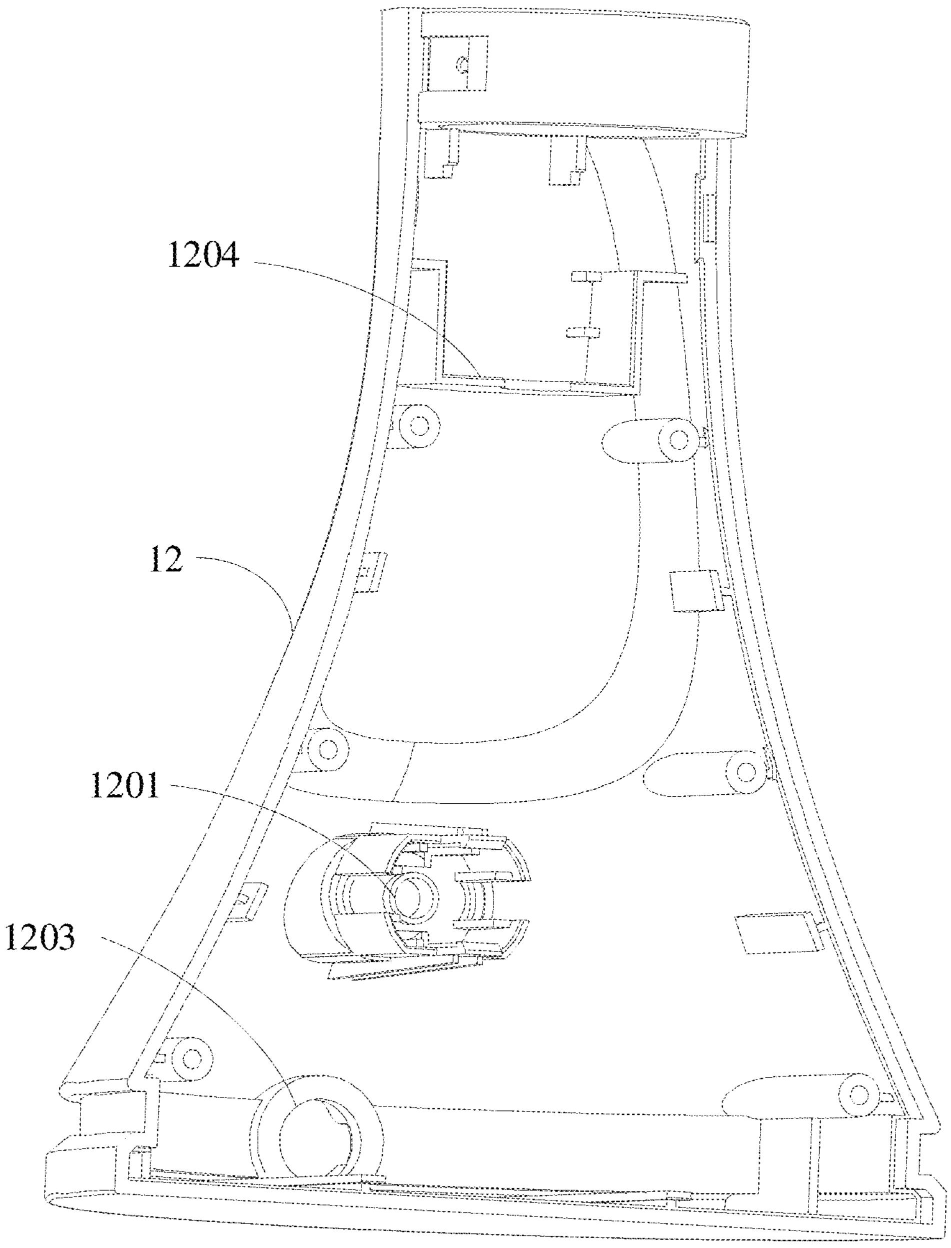
FIG. 9 is a structure diagram of a second sub housing of FIG. 3.
Figure 10:
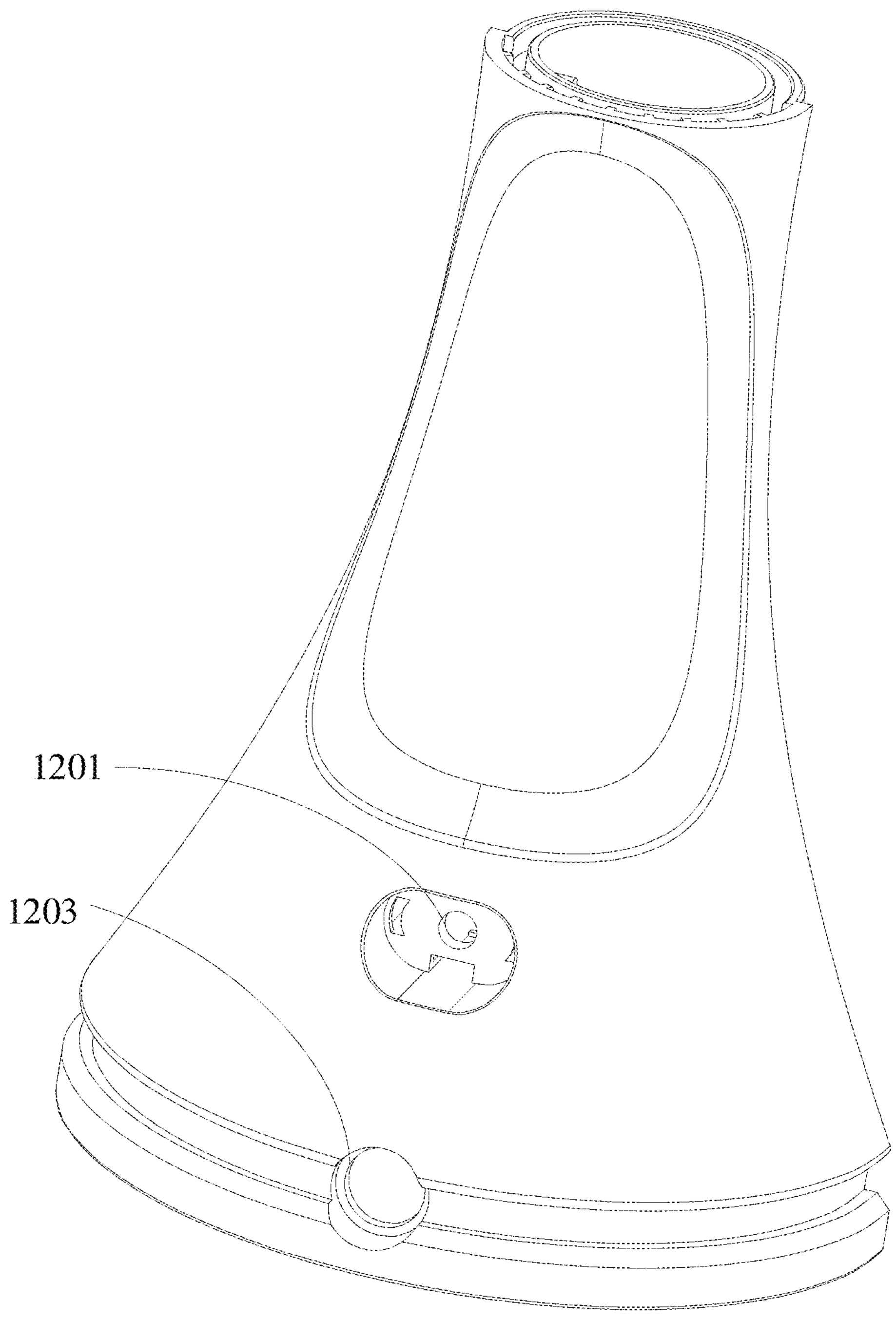
FIG. 10 is another structure diagram of the second sub housing of FIG. 3.
Figure 11:
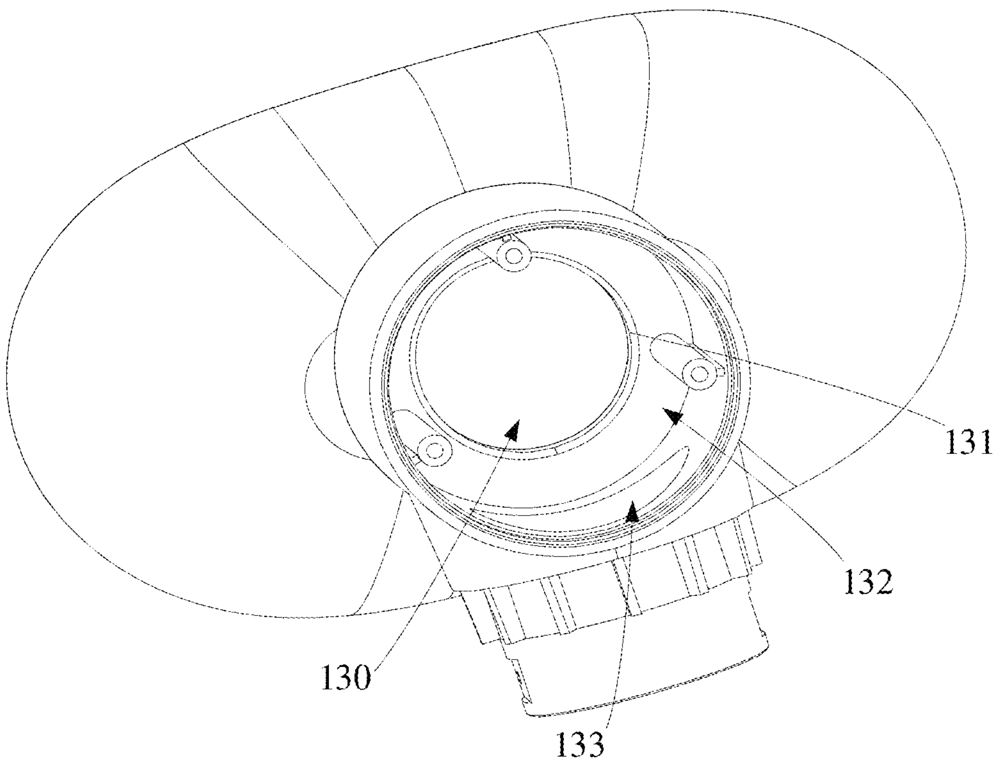
FIG. 11 is a structure diagram of a third sub housing of FIG. 3.
Figure 12:
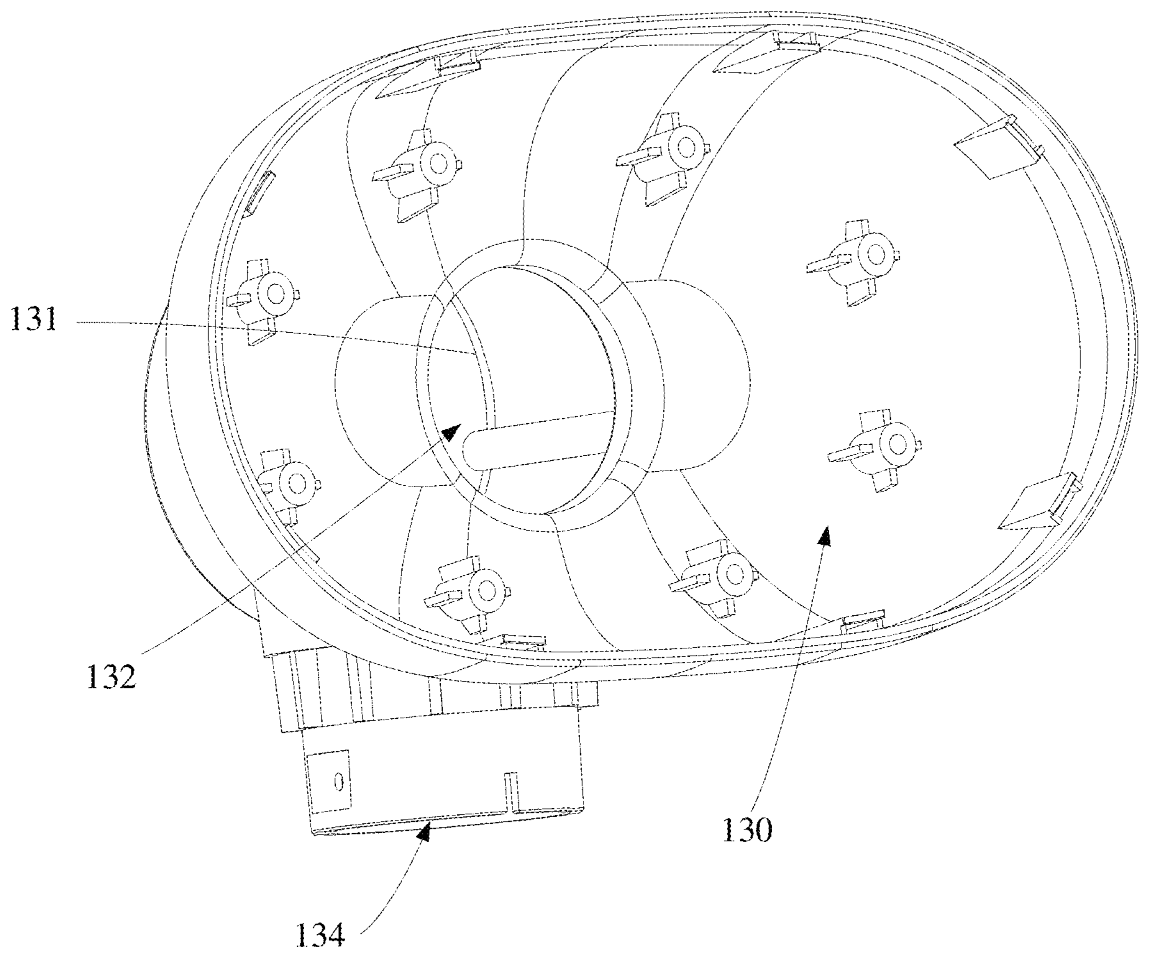
FIG. 12 is another structure diagram of the third sub housing of FIG. 3.
Figure 13:
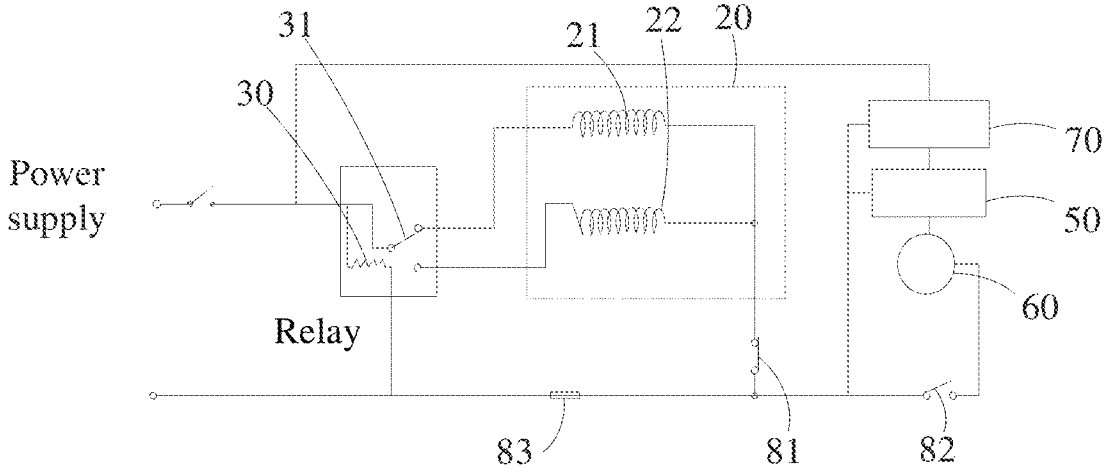
FIG. 13 is a circuit diagram explaining an operation of the garment steamer of FIG. 1.
Figure 14:
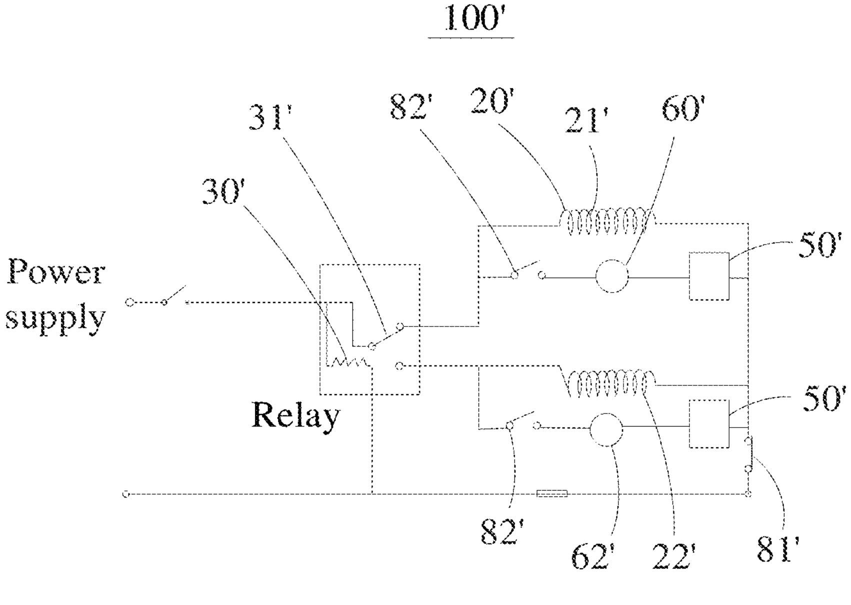
FIG. 14 is a circuit diagram explaining an operation of a garment steamer according to a second embodiment.

Referring to FIG. 14, the present disclosure further provides a garment steamer 100' according to a second embodiment. The garment steamer 100' is similar with the garment steamer 100, the differences between the two at least include: the garment steamer 100' further includes a high power water pump 62' which may be operated well at 220V power supply; a power of the high power water pump 62 is about 11-24 w; the high power water pump 62' and the low power water pump 60' are both electrically connected with the relay 30' and communicated with the evaporation assembly 20'. The single chip unit 50' can also control a water pump speed of the high power water pump 62' to adjust a steam output amount.

The first switch 31' of the relay 30' is normally connected with the first heating member 21' and the low power water pump 60'. When the garment steamer 100' is connected to the power supply with a voltage less than 176V, the magnetic force generated by the relay 30' is too small to move and connect with the second heating member 22' and the high power water pump 62', and the first switch 31' remains connecting with the first heating member 21' and the low power water pump 60'; when the garment steamer 100' is connected to the power supply with a voltage no less than 176V, the magnetic force generated by the relay 30' is capable of moving the first switch 31' to connect with the second heating member 22' and the high power water pump 62' within about 20 ms. In this way, the garment steamer 100' is capable of safely operating while generating a constant output without requiring a separate user operation even when the garment steamer 100' is connected to the power supply either 100V or 220V.

The first temperature controller 81' is configured to detect a first temperature of the evaporator assembly 20' and disconnect the evaporator assembly 20' from the power supply when the first temperature exceeds a first preset temperature. The second temperature controller 82' is configured to detect a second temperature of the evaporator assembly 20' and control the low power water pump 60' or the high power water pump 62' to pump the water into the evaporator assembly 20' when the second temperature reaches a second preset temperature.

Figure 15:
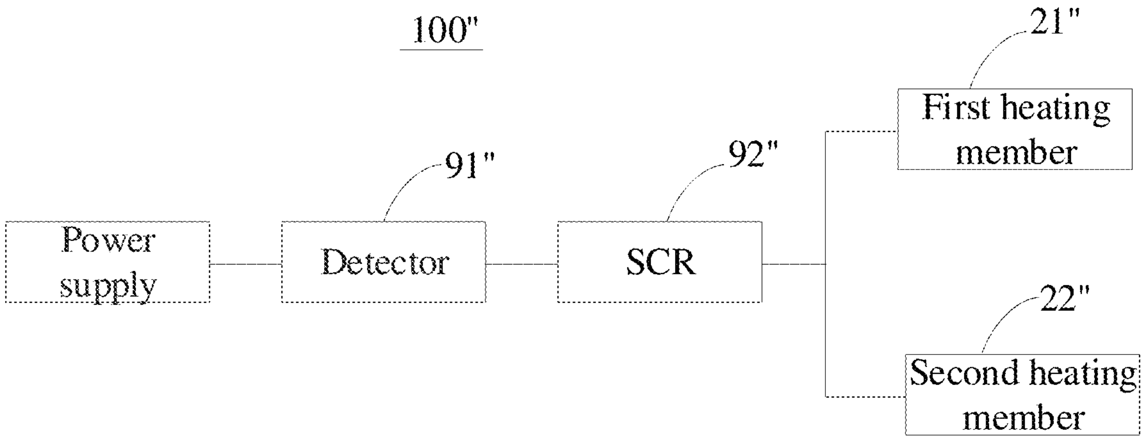
FIG. 15 is a block diagram illustrating a configuration of a garment steamer according to a third embodiment.

Referring to FIG. 15, the present disclosure further provides a garment steamer 100" according to a third embodiment. The garment steamer 100" is similar with the garment steamer 100, the differences between the two at least include: the garment steamer 100" includes a detector 91" and a silicon controlled rectifier (SCR) 92" electrically connected with the detector 91", the detector 91" detects the voltage of the power supply, and the SCR 90" can connect 110V power supply to the first heating member 21" or connects 220V power supply to the second heating member 22" according to a detection result. In this way, the garment steamer 100" is capable of safely operating while generating a constant output without requiring a separate user operation even when the garment steamer 100" is connected to the power supply either 100V or 220V.

Figure 16:
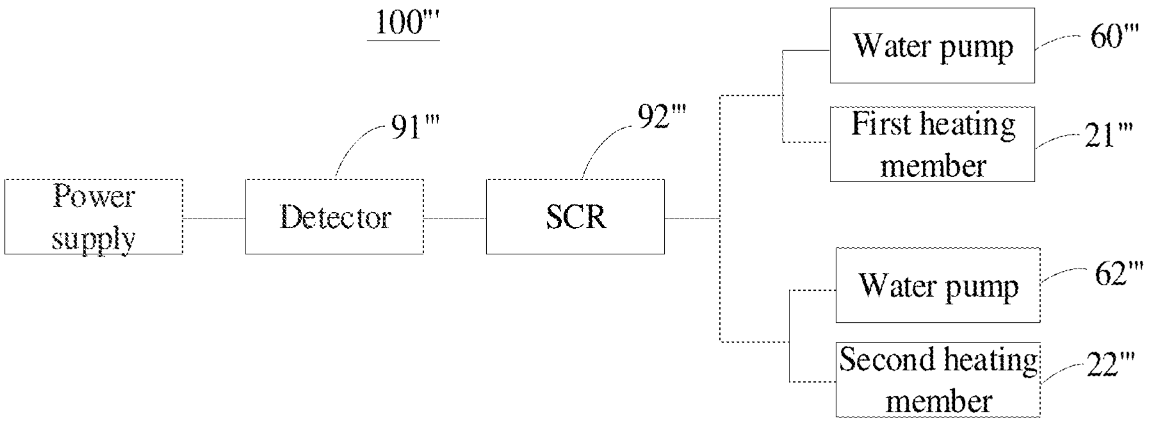
FIG. 16 is a block diagram illustrating a configuration of a garment steamer according to a fourth embodiment.

Referring to FIG. 16, the present disclosure further provides a garment steamer 100'" according to a fourth embodiment. The garment steamer 100'" is similar with the garment steamer 100', the differences between the two at least include: the garment steamer 100'" includes a detector 91'" and a silicon controlled rectifier (SCR) 92" electrically connected with the detector 91'", the detector 91'" detects the voltage of the power supply, and the SCR 90'" can control 110V power supply to the first heating member 21'" and the low power water pump 60'" or connects 220V power supply to the second heating member 22'" and the high power water pump 62'" according to a detection result. In this way, the garment steamer 100'" is capable of safely operating while generating a constant output without requiring a separate user operation even when the garment steamer 100'" is connected to the power supply either 100V or 220V.

Figure 17:
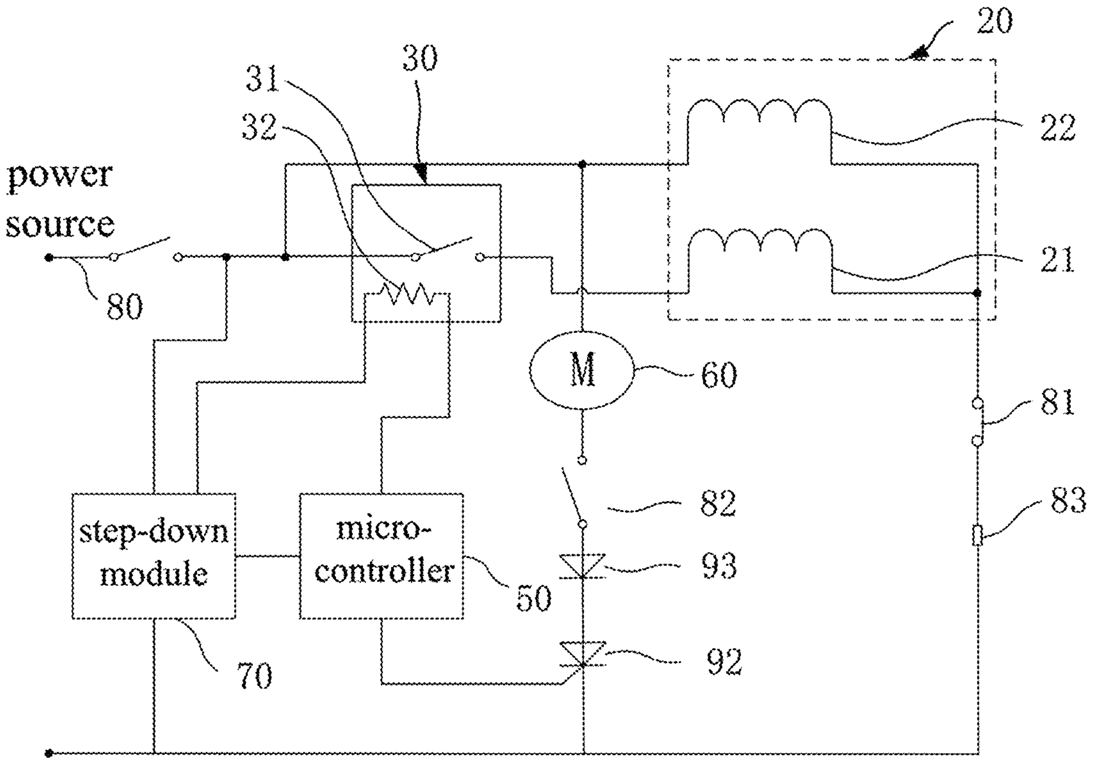
FIG. 17 is a circuit diagram of the garment steamer shown in FIG. 1.
Figure 18:
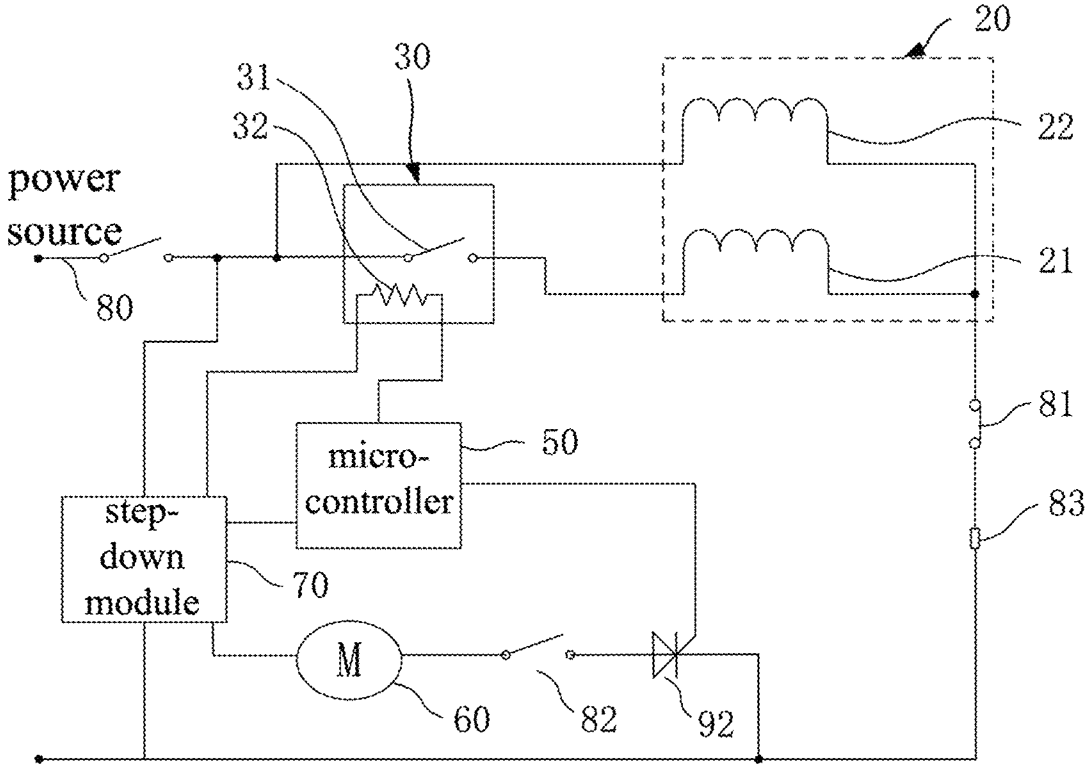
FIG. 18 is another circuit diagram of the garment steamer shown in FIG. 1.

The present disclosure further provides a garment steamer having another circuit configuration as shown in FIGS. 17 and 18.

The present embodiment provides a garment steamer 100, which is a handheld garment steamer.

The garment steamer 100 includes a housing 10, a water tank 14 configured to store water, an evaporator assembly 20 communicated to the water tank 14 and configured to generate steam, a water pump 60 configured to transfer the water from the water tank 14 to an evaporation chamber 24, and a switch assembly 30 configured to connect the evaporator assembly 20 to a power source. The power source may be an alternate-current (AC) voltage of 100V-240 V. The evaporator assembly 20 includes a first heating member 21 and a second heating member 22. A resistance of the first heating member 21 is adapted to a first voltage, and a resistance of the second heating member 22 is adapted to a second voltage. The first voltage is less than the second voltage. It is understood that, in an embodiment, a voltage range of the first voltage is from 100 V to 130 V, and a voltage range of the second voltage is from 200V to 240V. The present embodiments will be illustrated by taking the first voltage of 110 V and the second voltage of 220 V as an example.

When the voltage of 220V is input to the garment steamer 100, voltage of 220V is input to the second heating member 22. That is, the second heating member 22 is operating at the voltage of 220V. In this case, the switch assembly 30 is in a disconnected state by default, and the first heating member 21 is not conducted, i.e., the first heating member 21 is not operating.

When the voltage of 110V is input to the garment steamer 100, the switch assembly 30 is conducted, such that the first heating member 21 is conducted, and at the same time, the second heating member 22 is conducted. That is, the first heating member 21 and the second heating member 22 are operating at the same time at the voltage of 110V. The switch assembly 30 inputs the voltage of 110V to the first heating member 21 and the second heating member 22, or inputs the voltage of 220V to the second heating member 22. In this way, regardless of the voltage of 110V or the voltage of 220V being input to the garment steamer 100, the garment steamer 100 can operate stably without any manual operation by the user.

To be noted that, when the power supply outputs the 220V AC voltage, the second heating member 22 is conducted and operates normally. When the power supply is switched to output the low voltage (110V), a power of the second heating member 22 is reduced. The second heating member 22 alone, when receiving the voltage of 110V, does not enable the evaporator assembly to operate properly. When the voltage of 110V is supplied, the first heating member 21 and the second heating member 22 need to operate cooperatively to allow the garment steamer 100 to operate normally.

In an embodiment, the garment steamer 100 includes a power input end 80 and a single-chip microcontroller 50. The power input end 80 is connected to the power source, such as the mains electricity. In an embodiment, the power input end 80 may be a plug. The power input end 80 is connected to the second heating member 22. The microcontroller 50 is connected to the switch assembly 30. The switch assembly 30 is disconnected by default and can only be switched on when an electrical signal is inputted into the switch assembly 30 from the microcontroller 50.

When the microcontroller 50 detects that the voltage of 110V is input from the power input end 80, the microcontroller 50 controls the switch assembly 30 to be conducted, and the power input end 80 is conducted with the first heating member 21. The second heating member 22 is conducted with the power input end 80 by default, and that is, the second heating member 22 is constantly connected to the power supply through the power input end 80 regardless of whether the power supply voltage is the AC voltage of 110V or 220V. The microcontroller 50 controls, through the switch assembly 30, the first heating member 21 to be conducted to or disconnected from the power input end 80.

In an embodiment, the switch assembly 30 includes a relay, the relay is connected between the power input end 80 and the first heating member 21. The relay can be conducted or disconnected by being controlled by the microcontroller 50, so as to enable the first heating member 21 to be conducted with or disconnected from the power input end 80. For example, when the microcontroller 50 detects that the voltage at the power input end 80 is 110V, the relay is conducted, enabling the first heating member 21 to be conducted with the power input end 80. In this case, both the first heating member 21 and the second heating member 22 are conducted to the power input end 80 and operate at the AC voltage of 110V. The first heating member 21 and the second heating member 22 are connected to each other in parallel. In another example, when the microcontroller 50 detects that the voltage at the power input end 80 is 220V, the relay is disconnected by default, the first heating member 21 is disconnected from the power input end 80. In this case, the first heating member 21 does not operate, and the second heating member 22 is connected to the power input end 80 and operates at the AC voltage of 220V. In this way, the garment steamer 100 can always operate stably without any additional manual operation by the user, regardless of the garment steamer 100 being connected to the voltage of 110V or 220V. In some embodiments, the relay is in a constantly disconnected state, and only the second heating member 22 is connected to the power input end 80 for regions where the power supply is at the voltage of 220V. In other embodiments, the relay may be in a constantly conducted state, the first heating member 21 and the second heating member 22 are connected with each other in parallel and are both connected to the power input end 80, such that the garment steamer is suitable for operating at regions where the power supply is at the voltage of 110V. The relay is large in size, generate a reduced amount of heat when controlling high power loads, and is less costly.

The relay includes a first switch 31 and an electromagnet 32. The first switch 31 is connected between the first heating member 21 and the power input end 80. The first switch 31 may be a constantly-off switch. In this case, the first heating member 21 is disconnected from the power input end 80, and that is, the first heating member 21 is disconnected to the power source by default. When the microcontroller 50 detects that the garment steamer 100 receives the voltage of 220V, the first switch 31 is disconnected, and the first heating member 21 is disconnected from the power supply. When the microcontroller 50 detects that the garment steamer 100 receives the voltage of 110V, the microcontroller 50 controls the electromagnet 32 in the relay to generate a first magnetic force to drive the first switch 31 to be conducted, such that the first heating member 21 is connected to the power supply. To be noted that when the power supply input to the power input end 80 is switched from the voltage of 110V to the voltage of 220V, the microcontroller 50 controls the electromagnet in the relay to stop generating any magnetic force, inner components, such as a spring, of the first switch 31 is reset to enable the first switch 31 to be disconnected.

It is understood that the relay may be replaced with a controllable silicon member. When the microcontroller 50 detects that the garment steamer 100 receives the voltage of 110V, the microcontroller 50 controls the controllable silicon member to be conducted, and the first heating member 21 is connected to the power input end 80. When the garment steamer 100 receives the second voltage (such as 220V), the microcontroller 50 controls the controllable silicon member to be disconnected, and the first heating member 21 is disconnected from the power input end 80.

Both the first heating member 21 and the second heating member 22 are made of metal, such as aluminum, aluminum alloy, copper, copper alloy, or magnesium oxide. The first heating member 21 and the second heating member 22 are two independent members. The first heating member 21 and the second heating member 22 may be pressure-casted in the evaporation chamber 24. The first heating member 21 may be a heating coil, and the second heating member 22 may also be a heating coil. The first heating member 21 may surround the second heating member 22. The first heating member 21 may be spaced apart from the second heating member 22.

The evaporator assembly 20 further includes an evaporation chamber 24 communicated with the water tank 14, a first cover 23 covered on a first side of the evaporation chamber 24, a first receiving member 241 disposed in the evaporation chamber 24 and receiving the first heating member 21, a second receiving member 242 disposed in the evaporation chamber 24 and receiving the second heating member 22, a second cover 25 covered on a second side of the evaporation chamber 24, and a rear cover 27 connected to the evaporation chamber 24. The first heating member 21 and the second heating member 22 may be pressure-casted in the evaporation chamber 24 and are sealed in the first receiving member 241 and the second receiving member 242, respectively.

The first heating member 21 and the second heating member 22 are received in the evaporation chamber 24 to heat water received in the evaporation chamber 24. The evaporation chamber 24, the first receiving member 241, the second receiving member 242, and the first cover 23 cooperatively define a first evaporation sub-chamber 2401. The evaporation chamber 24, the first receiving member 241, the second receiving member 242, and the second cover 25 cooperatively define a second evaporation sub-chamber 2402 communicated with the first evaporation sub-chamber 2401.

The first cover 23 includes an inlet portion 231 and a first through hole 232 communicated with the water tank 14. The first through hole 232 communicates the inlet portion 231 with the first evaporation sub-chamber 2401. The second cover 25 defines a plurality of second through holes 251 and a plurality of third through holes 252 communicated with the second evaporation sub-chamber 2402. The steam generated in the evaporation chamber 24 flows out of the chamber through the third through holes 252. The plurality of third through holes 252 are arranged in a straight line, and the plurality of second through holes 251 are arranged around or on both sides of the third through holes 252.

The evaporation chamber 24 includes a side wall 2403 and an intermediate wall 2404. The intermediate wall 2404 defines at least one fourth through hole 2405. The fourth through hole 2405 communicates the first evaporation sub-chamber 2401 with the second evaporation sub-chamber 2402. The fourth through hole 2405 may be located at a middle portion of the intermediate wall 2404. The side wall 2403, the intermediate wall 2404, the first receiving member 241, the second receiving member 242, and the first cover 23 cooperatively define the first evaporation sub-chamber 2401. The side wall 2403, the intermediate wall 2404, the first receiving member 241, the second receiving member 242, and the second cover 25 cooperatively define the second evaporation sub-chamber 2402. In an embodiment, the first receiving member 241 and the second receiving member 242 protrude from two sides of the intermediate wall 2404, respectively.

A plurality of first guiding portions 243 are arranged in the first evaporation sub-chamber 2401 and cooperatively define at least one first water flowing passage. A plurality of second guiding portions 246 are arranged in the second evaporation sub-chamber 2402 and cooperatively define at least one second water flowing passage. In an embodiment, the first water flowing passage may be arranged symmetrically, and the second water flow passage may be arranged symmetrically.

A first connection plate 244 and a second connection plate 245 are protruding from the side wall 2403. The first connection plate 244 and the second connection plate 245 are extending towards each other. The first connection plate 244 is arranged with two first connecting portions 2441. The second connection plate 245 is arranged with two second connecting portions 2451. The first heating member 21 includes two connecting ends 211 that can be electrically connected to the switching assembly 30, such as the relay. The second heating member 22 includes two connecting ends 221 that can be electrically connected to the switching assembly 30. The connecting ends 211 of the first heating member are received in the first connecting portion 2441 and are electrically connected to the relay. The connecting ends 221 of the second heating member are received in the second connecting portion 2451 and are electrically connected to the relay.

In an embodiment, a length of the first heating member 21 is greater than a length of the second heating member 22. Therefore, the first heating member 21 having the lower resistance may have a high heating efficiency. Understandably, the length of the second heating member 22 may alternatively be greater than the length of the first heating member 21.

The first heating member 21 is substantially annular, oval, square, hexagonal, triangular or irregularly shaped. The two connecting ends 211 of the first heating member 21 are separated from each other and extend towards the two first connecting portions 2441. The second heating member 22 is substantially annular, oval, square, hexagonal, triangular or irregularly shaped. The two connecting ends 221 of the second heating member 22 are separated from each other and extend towards the two second connecting portions 2451. The first heating member 21 is disposed around the second heating member 22. The two connecting ends 221 are disposed on a side of the first heating member 21 away from the connecting ends 211, preventing short-circuits caused by incorrect connection of wires, and increasing an operating space for connecting the wires to the end portions.

The side wall 2403 includes a first step 2406 and a second step 2407. Both the first step 2406 and the second step 2407 are disposed along an inner surface of the side wall 2403. The first cover 23 is arranged on the first step 2406. The second cover 25 is arranged on the second step 2407. The first cover 23 defines a notch 233 and a notch 234. The first connection plate 244 is received in the notch 233, and the second connection plate 245 is received in the notch 234.

The evaporator assembly 20 further includes a plurality of positioning portions 247, and each positioning portion 247 may be a positioning rod or a positioning post. The plurality of positioning portions 247 are arranged on the second guiding portion 246, the intermediate wall 2404, the first receiving member 241, and the second receiving member 242. In an embodiment, the positioning portions 247 are received in the second through holes 251 of the second cover 25, and at least one positioning portion 247 does not completely fill the corresponding second through hole 251. That is, a gap is defined between an outer wall of at least one positioning portion 247 and an inner wall of the corresponding second through hole 251. The steam generated in the first evaporation sub-chamber 2401 and the second evaporation sub-chamber 2402 may flow through the gap. In another embodiment, the positioning portions 247 are received in the second through holes 251 of the second cover 25, and each positioning portion 247 completely fills the corresponding second through hole 251, preventing the steam generated in the first evaporation sub-chamber 2401 and the second evaporation sub-chamber 2402 from flowing out through the second through hole 251. In still another embodiment, part of the plurality of positioning portions 247 are received in the second through holes 251, and the rest part of the positioning portions 247 are received in the third through holes 252. The second through hole 251 may be completely filled or incompletely filled by the positioning portions 247, and the third through holes 252 are not completely filled by the positioning portions 247. The steamer generated in the first evaporation sub-chamber and the second evaporation sub-chamber may flow through the third through holes 252.

The evaporator assembly 20 further includes an outer cover 26. The outer cover 26 defines a plurality of first outlets 261 and a second outlet 262. In an embodiment, a diameter of each first outlet 261 is 10 mm-20 mm. A diameter of the second outlet 262 is 40 mm-80 mm. A few of the plurality of third through holes 252 located at a middle portion of the second cover 25 correspond to the second outlet 262. The rest of the plurality of third through holes 252 correspond to the plurality of first outlets 261. Specifically, three of the plurality of third through holes 252 located at the middle portion of the second cover 25 correspond to the second outlet 262, and the rest of the plurality of third through holes 252 correspond to the plurality of first outlets 261. In an embodiment, a diameter of each third through-hole 252 is the same as the diameter of each second through hole 251. The positioning portions 247 include a plurality of first positioning portions and a plurality of second positioning portions. The first positioning portions are received in the second through holes 251 to connect the cover 25 to the evaporation chamber 24. A size of each first positioning portion may be equal to or slightly less than a size of each second through hole 251. The second through holes 251 are filled by the corresponding first locating portions, or a small first gap is defined between at least one first positioning portion and the inner wall of the corresponding second through hole 251, and the steam generated by the first evaporation sub-chamber and the second evaporation sub-chamber may flow though the gap. The size of each first positioning portion may be slightly greater than the size of each second through hole 251, and the first positioning portions are in interference fit with the corresponding second through holes 251. The size of the second positioning portion is smaller than a size of the third through hole 252. The second positioning portions are received in the corresponding third through holes 252. A second gap is defined between at least one second positioning portion and an inner wall of the corresponding third through hole 252. The steam generated by the first evaporation sub-chamber and the second evaporation sub-chamber may flow out through the second gap.

The microcontroller 50 is connected to the water pump 60. The water pump 60 is configured with a motor. The microcontroller 50 may control a pumping speed of the water pump 60 to regulate the amount of steam output from the steamer. The water pump 60 has a relatively low power of about 1 w-10 w. The low-power water pump 60 has a small size suitable for the handheld garment steamer 100.

The handheld garment steamer 100 further includes a step-down module 70 electrically connected to the microcontroller 50. The step-down module 70 is connected between the power input end 80 and the microcontroller 50. The step-down module 70 is configured to reduce the input voltage of 220V or 110V to an operating voltage suitable for the microcontroller 50 to operate. The step-down module 70 may be an AC-DC step-down transformer. In an embodiment, the step-down module 70 may be integrated in a PCB board 40. In another embodiment, the step-down module 70 and the PCB board 40 are two independent components, where the step-down module 70 is arranged on and electrically connected to the PCB board 40.

In an embodiment, the step-down module 70 is a transformer. The transformer is configured to separate a high voltage from a low voltage. The transformer is configured to reduce the input voltage of the power input end 80 to the operating voltage suitable for the microcontroller 50 to operate. In the present embodiment, the step-down module 70 only reduces the input voltage of the power input end 80 to the operating voltage suitable for the microcontroller 50.

In an embodiment, the step-down module 70 is a resistive voltage-reducing circuit. Since the resistive voltage-reducing circuit has a low power, a voltage provided therefrom may drive only the microcontroller 50 and the switch assembly 30 to operate and cannot drive the water pump 60 to operate. In the present embodiment, the step-down module 70 reduces the input voltage of the power input end 80 to the operating voltage suitable for the microcontroller 50 and switch assembly 30.

In an embodiment, as shown in FIG. 17, the water pump 60 may be connected to the power input end 80. That is, the water pump 60 may operate at the voltage of 110V or 220V provided from the power supply. The water pump 60 may be an electromagnetic pump that is driven by a high-voltage AC. The water pump 60 may be directly powered by the high-voltage power supply. Compared to the water pump powered by a low-voltage DC, the step-down module 70 does not need to supply power to the water pump 60 of the present disclosure, and the step-down module 70 needs to power only a low-power device, such as the microcontroller 50. The size of the step-down module 70 may be reduced, and costs of the step-down module 70 may be reduced. For example, a power of the step-down module 70 may be less than 1 w.

The garment steamer 100 further includes a switch circuit 92. The switch circuit 92 is connected between the water pump 60 and the power input end 80. A control end of the switch circuit 92 is connected to the microcontroller 50. The microcontroller 50 may control the switch circuit 92 to be conducted or disconnected to control the water pump 60 to operate or not operate. The switch circuit 92 may include a control switch, which may be a controllable silicon device. The controllable silicon device may be small in size and has advantages when controlling small power loads. Of course, the control switch may be a switch in other types, such as a field effect tube. The present disclosure does not limit the type of the control switch.

In an embodiment, the garment steamer 100 further includes a diode 93. An end of the diode 93 is connected to the water pump 60, and the other end of the diode 93 is connected to the switch circuit 92. The diode 93 may convert the input AC into a DC and may perform a half-wave step-down on the input voltage. It is understood that in an embodiment, positions at which the switch circuit 92 and the diode 93 are arranged may be exchanged. The garment steamer 100 further includes: a first connection tube 143 communicating the water tank 14 with the water pump 60; and a second connection tube 144 communicating the water pump 60 with the evaporator assembly 20. The water tank 14 includes a first portion 141 and a second portion 142. The first portion 141 and the second portion 142 are connected to each other and cooperatively enclose a water storage space. The first connection tube 143 extends into the water storage space. The water pump 60 is disposed above the water tank 14. The first connection tube 143 and the second connection tube 144 are connected to two sides of the water pump 60, respectively.

The garment steamer 100 further includes a first thermostat 81. The first thermostat 81 is connected in a circuit of the evaporator assembly 20. It may be interpreted that the evaporator assembly 20 and the first thermostat 81 are connected in series in one circuit. The first thermostat 81 is configured to detect a first temperature of the evaporator assembly 20, such as a first temperature of the first heating member 21 or the second heating member 22. When the first temperature is greater than a first preset temperature, the first thermostat 81 disconnects the evaporator assembly 20 from the power supply. The first thermostat is constantly on, and that is, when the first temperature is not greater than the first preset temperature, the first thermostat 81 is conducted to enable the evaporator assembly 20 to operate normally. When the first temperature is greater than the first preset temperature, the first thermostat 81 is disconnected, such that the evaporator assembly 20 cannot operate. In some embodiments, the garment steamer 100 further includes a fuse. The fuse is connected in the circuit of the first thermostat 81 or the evaporator assembly 20. It may be interpreted that the fuse, the evaporator assembly 20 and the first thermostat 81 are connected in series to each other in one circuit. When the circuit is abnormal, the fuse protects the circuit. For example, the fuses may be a fuse wire. When the circuit is abnormal, the fuse wire is fused, such that the circuit is open, preventing hazards such as fire.

The garment steamer 100 further includes a second thermostat 82. The second thermostat 82 is connected in the circuit of the water pump 60. It is interpreted that the water pump 60 and the second thermostat 82 are connected in series with each other in one circuit. For example, an end of the second thermostat 82 is connected to the water pump, and the other end of the second thermostat 82 is connected to the switch circuit 92. It is understood that a location at which the second thermostat 82 is arranged may be adjusted based on demands. For example, the second thermostat 82 may be arranged between the switch circuit 92 and the power input end 80. The second thermostat 82 is configured to detect a second temperature of the water in the water tank 14 of the garment steamer 100. When the second temperature is lower than a second preset temperature, the second thermostat 82 is disconnected, and the water pump 60 cannot operate. When the second temperature reaches the second preset temperature, the second thermostat 82 is conducted, and the water pump 60 operates normally, such as the water pump 60 transferring the water in the water tank 14 to the evaporator assembly 20. The second thermostat 82 is constantly off, i.e., when the second temperature is lower than the second preset temperature, the second thermostat 82 is disconnected, and the water pump cannot operate; and when the second temperature reaches the second preset temperature, the second thermostat 82 is conducted, enabling the water pump 60 to operate normally. The rear cover 27 includes a mounting portion 271 for mounting the first thermostat 81 and the second thermostat 82. The second connecting tube 144 extends through the mounting portion 271 to connect with the evaporation chamber 24. In an embodiment, the first thermostat 81 has a constantly-on switch, and the second thermostat 82 has a constantly-off switch.

In an embodiment, the garment steamer 100 may not be arranged with the second thermostat 82. In this case, the garment steamer 100 controls the power of the water pump based on preset time set by the microcontroller 50. In an embodiment, the power of the water pump may be adapted to the operating frequency of the water pump 60 or the amount of water output from the water pump 60. Exemplarily, the preset time may be 20 seconds.

The garment steamer 100 further includes a housing 10, a switch 124 arranged on the housing 10, a display panel 126 arranged on the housing 10, at least one button 127 arranged on the display panel 126, a PCB 40, a fuse 83, and a plug 123 electrically connected to the PCB 40. The water tank 14 may be partially exposed from the housing 10.

The housing 10 includes a first sub-housing 11, a second sub-housing 12 connected to the first sub-housing 11, and a third sub-housing 13. A relay, the PCB board 40, the microcontroller 50, and a portion of the evaporator assembly 20 are arranged in the third sub-housing 13.

The first sub-housing 11 includes a support portion 111 for supporting the water tank 14, a receiving portion 112 for receiving a portion of the water tank 14, and a first mounting portion 113. The second sub-housing 12 defines a fifth through hole 1201 for exposing the switch 124 and a sixth through hole 1203 through which a power supply wire 122 passes. The plug 123 is connected to the wire 122. The garment steamer 100 is connected to the power supply through the wire 122 and the plug 123. The second sub-housing 12 further includes a second mounting portion 1204. The water pump 60 is mounted to the first mounting portion 113 and the second mounting portion 1204.

The third sub-housing 13 includes a first receiving chamber 130, a seventh through hole 131, a second receiving chamber 132, an eighth through hole 133, and a passage 134. The second receiving chamber 132 is communicated with the first receiving chamber 130 through the seventh through hole 131. The passage 134 is communicated with the second receiving chamber 132 through the eighth through hole 133. The first receiving chamber 130 receives a portion of the evaporator assembly 20. The second receiving chamber 132 receives the relay, the PCB board 40, and the microcontroller 50. The second connection tube 144 is communicated with the evaporation chamber 24 by passing through the passage 134, the second receiving chamber 132, and the first receiving chamber 130.

As shown in FIG. 18, another circuit diagram of the operation of the garment steamer 100 is shown. To be noted that in the present embodiment, the housing 10, the water tank 14, the evaporator assembly 20, the switch assembly 30, the microcontroller 50, the water pump 60, and the step-down module 70 are the same as those in the previous embodiments and will not be repeated herein. In the present embodiment, the water pump 60 is connected to an output end of the step-down module 70, i.e., the water pump 60 may operate at the voltage provided by the step-down module 70. The step-down module 70 is configured to reduce the input voltage of 220V or 110V to a voltage suitable for the microcontroller 50 and the water pump 60 to operate. In this case, the water pump 60 operates with the low-voltage DC.

The garment steamer 100 further includes the switch circuit 92, connected between the water pump 60 and the power input end 80. A control end of the switch circuit 92 is connected to the microcontroller 50. The microcontroller 50 controls the switch circuit 92 to be conducted or disconnected, such that the water pump 60 is controlled to operate or not operate. The switch circuit 92 includes a control switch, which may be a controllable silicon member. The controllable silicon member is small in size and has advantages in controlling small power loads. Of course, the control switch may be switches in other types, such as a field effect tube. The present embodiment does not limit the type of the control switch.

In another embodiment, as shown in FIG. 1-4, FIG. 7-12, and FIG. 19-22, the garment steamer 100 may be a handheld garment steamer. The garment steamer 100 includes the housing 10, the water tank 14 configured to store the water, the evaporator assembly 20 communicated with the water tank 14 and configured to generate steam, the water pump 60 that transfers the water from the water tank 14 to the evaporation chamber 24, the power input end 80 configured to input power to the garment steamer, the first switch 30 that connects the evaporator assembly 20 to the power input end 80, and the microcontroller 50 that is connected to the first switch 30 and is configured to control the first switch 30.

The power supply may provide the AC voltage of 100V-240V. The microcontroller 50 controls a conduction time length that the first switch 30 is conducted, such that a conduction time length that the power input end 80 is conducted with the evaporator assembly 20 is controlled. In this way, the evaporator assembly 20 can operate normally regardless of the power supply input to the garment steamer 100 having a high voltage (such as 220V) or a low voltage (such as 110V), that is, the evaporator assembly 20 has high compatibility, the garment steamer 100 can operate stably without any additional operation performed by the user.

In an embodiment, the microcontroller 50 is connected to the power input end 80. The microcontroller 50 may detect the input voltage at the power input end 80 and adjust the conduction time length of the first switch 30 based on the input voltage. The input voltage is negatively correlated with the conduction time length.

Exemplarily, when a first voltage, such as a voltage of 220V, is input to the garment steamer 100, the microcontroller 50 controls the first switch 30 to be conducted for a first time length. When a second voltage, such as a voltage of 110V, is input to the garment steamer 100, the microcontroller 50 controls the first switch 30 to be conducted for a second time length. The second time length is longer than the first time length.

For example, the microcontroller 50 may send a pulse signal such as a PWM signal to control the conduction time length of the first switch 30. The first time length may occupy 50% of one cycle, and the second time length may occupy 100% of one cycle. Specifically, when the voltage of 220V is input to the garment steamer 100, the microcontroller 50 sends a PWM signal having a duty cycle of 50% to the first switch 30, and that is, the first switch 30 is conducted for a half of one cycle, such that an operating time length of the evaporator assembly 20 is reduced. When the voltage of 110V is input to the garment steamer 100, the microcontroller 50 sends a PWM signal having a duty cycle of 100% to the first switch 30, and that is, the first switch 30 is constantly conducted, for the entire cycle.

In an embodiment, the power input end 80 is a plug. The first switch 30 is disconnected by default, and the first switch 30 can only be switched on when the microcontroller 50 inputs an electrical signal.

The evaporator assembly 20 includes a heating member 21, which may be made of metal, such as aluminium, aluminium alloy, copper, copper alloy, or magnesium oxide. The heating member 21 may be pressure-casted in the evaporation chamber 24. The heating member may be a heating coil.

The heating member 21 includes a first portion 212 and a second portion 214. The evaporator assembly 20 further includes: the evaporation chamber 24 communicated with the water tank 14; a first cover 23 covering a first side of the evaporation chamber 24; a first receiving member 241 received in the evaporation chamber 24 and receiving the first portion 212; a second receiving member 242 received in the evaporation chamber 24 and receiving the second portion 214; a second cover 25 covering a second side of the evaporation chamber 24; and a rear cover 27 connected to the evaporation chamber 24. The first portion 212 and the second portion 214 of the heating member 21 may be pressure-casted in the evaporation chamber 24 and sealed in the first receiving member 241 and the second receiving member 242, respectively.

The first portion 212 and the second portion 214 of the heating member 21 are received in the evaporation chamber 24 to heat water received in the evaporation chamber 24. The evaporation chamber 24, the first receiving member 241, the second receiving member 242, and the first cover 23 cooperatively define a first evaporation sub-chamber 2401. The evaporation chamber 24, the first receiving member 241, the second receiving member 242, and the second cover 25 cooperatively define a second evaporation sub-chamber 2402 communicated with the first evaporation sub-chamber 2401.

The first cover 23 includes an inlet portion 231 and a first through hole 232 communicated with the water tank 14. The first through hole 232 communicates the inlet portion 231 with the first evaporation sub-chamber 2401. The second cover 25 defines a plurality of second through holes 251 and a plurality of third through holes 252 communicated with the second evaporation sub-chamber 2402. The steam generated in the evaporation chamber 24 flows out of the chamber through the third through holes 252. The plurality of third through holes 252 are arranged in a straight line, and the plurality of second through holes 251 are arranged around or on both sides of the third through holes 252.

The evaporation chamber 24 includes a side wall 2403 and an intermediate wall 2404. The intermediate wall 2404 defines at least one fourth through hole 2405. The fourth through hole 2405 communicates the first evaporation sub-chamber 2401 with the second evaporation sub-chamber 2402. The fourth through hole 2405 may be located at a middle portion of the intermediate wall 2404. The side wall 2403, the intermediate wall 2404, the first receiving member 241, the second receiving member 242, and the first cover 23 cooperatively define the first evaporation sub-chamber 2401. The side wall 2403, the intermediate wall 2404, the first receiving member 241, the second receiving member 242, and the second cover 25 cooperatively define the second evaporation sub-chamber 2402. In an embodiment, the first receiving member 241 and the second receiving member 242 protrude from two sides of the intermediate wall 2404, respectively.

A plurality of first guiding portions 243 are arranged in the first evaporation sub-chamber 2401 and cooperatively define at least one first water flowing passage. A plurality of second guiding portions 246 are arranged in the second evaporation sub-chamber 2402 and cooperatively define at least one second water flowing passage. In an embodiment, the first water flowing passage may be arranged symmetrically, and the second water flow passage may be arranged symmetrically.

A first connection plate 244 and a second connection plate 245 are protruding from the side wall 2403. The first connection plate 244 and the second connection plate 245 extending towards each other. The first connection plate 244 is arranged with two first connection portions 2441, and the second connection plate 245 is arranged with two second connection portions 2451. The heating member 21 includes two connection ends 211 electrically connected to the first switch 30, and the two connection ends 211 are received in the two first connection portions 2441 and are connected to the first switch 30.

The first portion 212 and the second portion 214 of the heating member 21 are substantially annular, oval, squared, hexagonal, triangular or irregularly shaped. The two connection ends 211 of the heating member 21 are spaced apart from each other and extend towards the first connection portions 2441.

The side wall 2403 includes a first step 2406 and a second step 2407. Both the first step 2406 and the second step 2407 are disposed along an inner surface of the side wall 2403. The first cover 23 is arranged on the first step 2406. The second cover 25 is arranged on the second step 2407. The first cover 23 defines a notch 233 and a notch 234. The first connection plate 244 is received in the notch 233, and the second connection plate 245 is received in the notch 234.

The evaporator assembly 20 further includes a plurality of positioning portions 247, and each positioning portion 247 may be a positioning rod or a positioning post. The plurality of positioning portions 247 are arranged on the second guiding portion 246, the intermediate wall 2404, the first receiving member 241, and the second receiving member 242. In an embodiment, the positioning portions 247 are received in the second through holes 251 of the second cover 25, and at least one positioning portion 247 does not completely fill the corresponding second through hole 251. That is, a gap is defined between an outer wall of at least one positioning portion 247 and an inner wall of the corresponding second through hole 251. The steam generated in the first evaporation sub-chamber 2401 and the second evaporation sub-chamber 2402 may flow through the gap. In another embodiment, the positioning portions 247 are received in the second through holes 251 of the second cover 25, and each positioning portion 247 completely fills the corresponding second through hole 251, preventing the steam generated in the first evaporation sub-chamber 2401 and the second evaporation sub-chamber 2402 from flowing out through the second through hole 251. In still another embodiment, part of the plurality of positioning portions 247 are received in the second through holes 251, and the rest part of the positioning portions 247 are received in the third through holes 252. The second through hole 251 may be completely filled or incompletely filled by the positioning portions 247, and the third through holes 252 are not completely filled by the positioning portions 247. The steamer generated in the first evaporation sub-chamber and the second evaporation sub-chamber may flow through the third through holes 252.

The evaporator assembly 20 further includes an outer cover 26. The outer cover 26 defines a plurality of first outlets 261 and a second outlet 262. In an embodiment, a diameter of each first outlet 261 is 10 mm-20 mm. A diameter of the second outlet 262 is 40 mm-80 mm. A few of the plurality of third through holes 252 located at a middle portion of the second cover 25 correspond to the second outlet 262. The rest of the plurality of third through holes 252 correspond to the plurality of first outlets 261. Specifically, three of the plurality of third through holes 252 located at the middle portion of the second cover 25 correspond to the second outlet 262, and the rest of the plurality of third through holes 252 correspond to the plurality of first outlets 261. In an embodiment, a diameter of each third through-hole 252 is the same as the diameter of each second through hole 251. The positioning portions 247 include a plurality of first positioning portions and a plurality of second positioning portions. The first positioning portions are received in the second through holes 251 to connect the cover 25 to the evaporation chamber 24. A size of each first positioning portion may be equal to or slightly less than a size of each second through hole 251. The second through holes 251 are filled by the corresponding first locating portions, or a small first gap is defined between at least one first positioning portion and the inner wall of the corresponding second through hole 251, and the steam generated by the first evaporation sub-chamber and the second evaporation sub-chamber may flow though the gap. The size of each first positioning portion may be slightly greater than the size of each second through hole 251, and the first positioning portions are in interference fit with the corresponding second through holes 251. The size of the second positioning portion is smaller than a size of the third through hole 252. The second positioning portions are received in the corresponding third through holes 252. A second gap is defined between at least one second positioning portion and an inner wall of the corresponding third through hole 252. The steam generated by the first evaporation sub-chamber and the second evaporation sub-chamber may flow out through the second gap.

In an embodiment, the microcontroller 50 is connected to the water pump 60. The water pump 60 is configured with a motor. The microcontroller 50 may control a pumping speed of the water pump 60 to regulate the amount of steam output from the steamer. The water pump 60 has a relatively low power of about 1 w-10 w. The low-power water pump 60 has a small size suitable for the handheld garment steamer 100.

In an embodiment, the evaporator assembly 20 further includes a temperature sensor 22. The heating member 21 is configured to heat the water in the evaporator assembly 20 to generate steam. The temperature sensor 22 is disposed adjacent to the heating member 21 and is configured to detect a temperature of the heating member 21. The microcontroller 50 is connected to the temperature sensor 22 and adjusts the conduction time length of the first switch 30 based on the temperature detected by the temperature sensor 22 and the input voltage at the power input end 80. The temperature is negatively correlated with the conduction time length. The temperature sensor 22 may be attached to the heating member 21, or may not be in contact with the heating member 21 but located at a region very close to the heating member 21, or may be connected to the heating member through a heat-conducting structure, where the heat-conducting structure may be made of a material having a high thermal conductivity, such as metal or water.

The microcontroller 50 may obtain the temperature of the heating member 21 through the temperature sensor 22 and adjust the conduction time length of the first switch 30 based on the temperature and the input voltage at the power input end 80. It is to be understood that, when the temperature of the heating member 21 of the evaporator assembly 20 is high, the conduction time length of the first switch 30 may be reduced. In this way, the power of the heating member 21 is reduced, such that the temperature of the heating member 21 is reduced or heating up of the heating member 21 is mitigated.

For example, the microcontroller 50 sends a pulse signal, such as a PWM signal, to control the conduction time length of the first switch 30. When the voltage of 220V is input to the garment steamer 100 and the temperature is in a normal range, the microcontroller 50 sends the PWM signal having the duty cycle of 50%. When the voltage of 220V is input to the garment steamer 100 and the temperature is higher than the normal range, the microcontroller 50 sends a PWM signal having a duty cycle of less than 50%, such as a PWM signal having a duty cycle of 40%, such that the operating time length of the evaporator assembly 20 is reduced. When the voltage of 110V is input to the garment steamer 100 and the temperature is in the normal range, the microcontroller 50 sends the PWM signal having the duty cycle of 100%. When the voltage of 110V is input to the garment steamer 100 and the temperature is higher than the normal range, the microcontroller 50 sends a PWM signal having a duty cycle of less than 100%, such as a PWM signal of 90%, such that the operating time length of the evaporator assembly 20 is reduced. In an embodiment, when the temperature exceeds a first preset temperature, the microcontroller 50 controls the first switch 30 to be disconnect to control the heating member 21 to be disconnected from the power supply. When the temperature of the heating member 21 is excessively high, the microcontroller 50 controls the first switch 30 to be disconnected, i.e., the microcontroller 50 controls the heating member 21 to be disconnected from the power supply, such that the heating member 21 is unable to operate, preventing the heating member 21 from burning out.

In an implementation, the microcontroller 50 adjusts the conduction time length of the first switch 30 so as to keep the temperature of the heating member 21 within a preset temperature range. Specifically, when the temperature sensor 22 detects that the temperature is low, such as lower than a second preset temperature, the microcontroller 50 increases the conduction time length of the first switch 30 so as to increase the temperature of the heating member 21, such that the temperature of the heating member 21 is maintained within a proper temperature range. When the temperature sensor 22 detects that the temperature is high, such as higher than a third preset temperature, the microcontroller 50 decreases the conduction time length of the first switch 30 to decrease the temperature of the heating member 21, such that the temperature of the heating member 21 is maintained within the proper temperature range. The third preset temperature is greater than the second preset temperature and is less than the first preset temperature. The first preset temperature, the second preset temperature, and the third preset temperature may be determined as desired, which will not be limited herein.

In some examples, the garment steamer 100 further includes a fuser 83. The fuser 83 is connected in the circuit of the heating member 21. That is, the fuser 83 and the heating member 21 are connected in series to each other in one circuit. When the circuit is abnormal, the fuser 83 protects the circuit. For example, the fuser 83 may be a fusing wire, and when the circuit is abnormal, the fusing wire is fused, such that the circuit is disrupted, the heating member 21 does not operate, preventing dangerous situation, such as a fire.

The first switch 30 may be a bi-directional controllable silicon device. The controllable silicon device is small in size and has advantages in controlling small power loads. Of course, the first switch 30 may be a switch in other types, which will not be limited herein.

In an embodiment, the garment steamer 100 further includes a step-down module 70 electrically connected to the microcontroller 50. The step-down module 70 is connected between the power input end 80 and the microcontroller 50. The step-down module 70 is configured to reduce the input voltage between 100V-240V (such as the input voltage of 220V or 110V) to a voltage suitable for the microcontroller 50 to operate. The step-down module 70 may be an AC-DC step-down transformer. In an embodiment, the buck module 70 may be integrated in the PCB board 40. In another embodiment, the step-down module 70 and the PCB board 40 are two components separated from each other, and the step-down module 70 is arranged on and electrically connected to the PCB board 40.

In some embodiments, the step-down module 70 is a transformer, and the transformer may separate high voltages from low voltages. The transformer may reduce the input voltage of the power input end 80 to a voltage suitable for the microcontroller 50 to operate. In the present embodiment, the step-down module 70 only reduces the input power at the power input end 80 to the voltage suitable for the microcontroller 50 to operate.

In some embodiments, the step-down module 70 is a resistive-capacitive voltage reduction circuit. Since the resistive-capacitive voltage reduction circuit has a low power, a voltage provided by the resistive-capacitive voltage reduction circuit is capable of driving only the microcontroller 50 to operate and cannot the water pump 60 to operate. In this embodiment, the step-down module 70 reduces the input voltage at the power input end 80 to the voltage suitable for the microcontroller 50 to operate.

In an embodiment, as shown in FIG. 21, the water pump 60 is connected to the power input end 80, and that is, the water pump 60 operates by the input voltage between 100V-240V (such as the 110V voltage or 220V voltage) provided by the power supply. The water pump 60 may be an electromagnetic pump driven by the high-voltage AC. The water pump 60 may be directly powered by the high voltage, and therefore, the step-down module 70 does not need to provide power to the water pump 60. The step-down module 70 only needs to power a low-power device, such as the microcontroller 50. Therefore, a size of the step-down module 70 may be reduced, and costs of the step-down module 70 may also be reduced. For example, the power of the step-down module 70 may be less than 1 w.

The garment steamer 100 further includes a second switch 92. The second switch 92 is connected to the water pump 60 and controls the water pump 60 to be conducted with or disconnected from the power supply. The microcontroller 50 is connected to the second switch 92 and controls a conduction time length of the second switch 92 to adjust the amount of water supplied by the water pump 60.

The second switch is connected between the water pump 60 and the power input end 80. A control end of the second switch 92 is connected to the microcontroller 50. The microcontroller 50 may control the second switch 92 to be switched on or off, to further control the water pump 60 to operate or stop operating.

In an embodiment, when the temperature detected by the temperature sensor 22 reaches a fourth preset temperature, the microcontroller 50 may control the second switch 92 to be conducted, such that the water pump 60 transfers the water from the water tank to the evaporator assembly 20. When the temperature does not reach the fourth preset temperature, the microcontroller 50 may control the second switch 92 to be disconnected, and the water pump 60 does not operate.

The second switch may include a control switch, which may be a controllable silicon device. The controllable silicon device is small in size and has advantages in controlling small power loads. Of course, the control switch may be a switch in another type, such as a field effect tube, which will not be limited herein.

In an embodiment, for the garment steamer 100, a power of the water pump may be controlled based on time preset by the microcontroller 50. In an embodiment, the power of the water pump includes an operating frequency of the water pump 60 or the amount of the water output from the water pump 60. Exemplarily, the preset time may be 20 seconds.

The garment steamer 100 further includes a housing 10, a switch 124 arranged on the housing 10, a display panel 126 arranged on the housing 10, at least one button 127 arranged on the display panel 126, a PCB board 40, a fuser 83, and a plug 123 electrically connected to the PCB board 40. The water tank 14 may be partially exposed from the housing 10.

The housing 10 includes a first sub-housing 11, a second sub-housing 12 connected to the first sub-housing 11, and a third sub-housing 13. A relay, the PCB board 40, the microcontroller 50, and part of the evaporator assembly 20 are received in the third sub-housing 13.

The first sub-housing 11 includes a support portion 111 for supporting the water tank 14, a receiving portion 112 for receiving a portion of the water tank 14, and a first mounting portion 113. The second sub-housing 12 defines a fifth through hole 1201 for exposing the switch 124 and a sixth through hole 1203 through which a power supply wire 122 passes. The plug 123 is connected to the wire 122. The garment steamer 100 is connected to the power supply through the wire 122 and the plug 123. The second sub-housing 12 further includes a second mounting portion 1204. The water pump 60 is mounted to the first mounting portion 113 and the second mounting portion 1204.

The third sub-housing 13 includes a first receiving chamber 130, a seventh through hole 131, a second receiving chamber 132, an eighth through hole 133, and a passage 134. The second receiving chamber 132 is communicated with the first receiving chamber 130 through the seventh through hole 131. The passage 134 is communicated with the second receiving chamber 132 through the eighth through hole 133. The first receiving chamber 130 receives a portion of the evaporator assembly 20. The second receiving chamber 132 receives the relay, the PCB board 40, and the microcontroller 50. The second connection tube 144 is communicated with the evaporation chamber 24 by passing through the passage 134, the second receiving chamber 132, and the first receiving chamber 130.

As shown in FIG. 22, another circuit diagram of the garment steamer 100 is shown. To be noted that in the present embodiment, the housing 10, the water tank 14, the evaporator assembly 20, the first switch 30, the microcontroller 50, the water pump 60, and the step-down module 70 are the same as those in the previous embodiments and will not be repeated herein. In the present embodiment, the water pump 60 is connected to an output end of the step-down module 70, i.e., the water pump 60 may operate at the voltage provided by the step-down module 70. The step-down module 70 is configured to reduce the input voltage of 220V or 110V to a voltage suitable for the microcontroller 50 and the water pump 60 to operate. In this case, the water pump 60 operates with the low-voltage DC.

The garment steamer 100 further includes the second switch 92, connected between the water pump 60 and the power input end 80. A control end of the second switch 92 is connected to the microcontroller 50. The microcontroller 50 controls the second switch 92 to be conducted or disconnected, such that the water pump 60 is controlled to operate or not operate. The second switch 92 includes a control switch, which may be a controllable silicon member. The controllable silicon member is small in size and has advantages in controlling small power loads. Of course, the control switch may be switches in other types, such as a field effect tube. The present embodiment does not limit the type of the control switch.

When the temperature detected by the temperature sensor 22 reaches the fourth preset temperature, the microcontroller 50 controls the second switch 92 to be conducted to enable the water pump 60 to transfer the water from the water tank to the evaporator assembly 20. When the temperature does not reach the fourth preset temperature, the microcontroller 50 controls the second switch 92 to be disconnected, and the water pump 60 does not operate.

The above description is merely some embodiments. It should be noted that for one with ordinary skills in the art, improvements can be made without departing from the concept of the present disclosure, but these improvements shall fall into the protection scope of the present disclosure.

What is claimed is:

1. A garment steamer, comprising:

a water tank, configured to store water;

an evaporator assembly, connected to the water tank and configured to generate steam;

a water pump, configured to transfer water from the water tank to the evaporator assembly;

a power input end, configured to input power from an external power supply source to the garment steamer;

a first switch, connected between the power input end and the evaporator assembly; and a microcontroller, connected to the first switch and configured to control a conduction time length of the first switch;

wherein, the microcontroller is configured to detect a voltage of the external power supply source that is input to the garment steamer through the power input end and adjust the conduction time length of the first switch based on the input voltage; and as the input voltage increases, the conduction time length is reduced accordingly.

2. The garment steamer according to claim 1, wherein, the microcontroller is connected to the power input end.

3. The garment steamer according to claim 2, wherein, the evaporator assembly comprises a heating member and a temperature sensor, the temperature sensor is disposed adjacent to the heating member and configured to detect a temperature of the heating member;

the microcontroller is connected to the temperature sensor and configured to adjust the conduction time length of the first switch based on the temperature detected by the temperature sensor and the input voltage of the power input end, the temperature is negatively correlated with the conduction time length.

4. The garment steamer according to claim 3, wherein, when the garment steamer receives a first input voltage and the temperature of the heating member is within a preset temperature range, the microcontroller sets the conduction time length of the first switch as a first conduction time length;

when the garment steamer receives the first input voltage and the temperature of the heating member is higher than an upper limit of the preset temperature range, the microcontroller sets the conduction time length of the first switch as a second conduction time length shorter than the first conduction time length.

5. The garment steamer according to claim 4, wherein, when the garment steamer receives a second input voltage lower than the first input voltage and the temperature of the heating member is within the preset temperature range, the microcontroller sets the conduction time length of the first switch as a third conduction time length longer than the first conduction time length; and when the garment steamer receives the second input voltage lower than the first input voltage and the temperature of the heating member is lower than the upper limit of the preset temperature range, the microcontroller sets the conduction time length of the first switch as a fourth conduction time length, which is shorter than the third conduction time length and longer than the first conduction time length.

6. The garment steamer according to claim 3, wherein, when the temperature is greater than a first preset temperature, the microcontroller controls the first switch to disconnect the heating member from a power supply.

7. The garment steamer according to claim 3, wherein, when the temperature is lower than a second preset temperature, the microcontroller increases the conduction time length of the first switch to maintain the temperature of the heating member within a preset temperature range; and when the temperature is higher than a third preset temperature, the microcontroller decreases the conduction time length of the first switch to reduce the temperature of the heating member to be within the preset temperature range, and the third preset temperature is greater than the second preset temperature.

8. The garment steamer according to claim 7, wherein, the first switch is disconnected from the power supply by default and is conducted to the power supply only when the microcontroller sends an electrical signal to control the first switch to be conducted.

9. The garment steamer according to claim 1, wherein the first switch is a bi-directional controllable silicon device.

10. The garment steamer according to claim 1, further comprising a second switch, wherein, the second switch is connected to the water pump and configured to control the water pump to be conducted with or disconnected from a power supply;

the microcontroller is connected to the second switch and configured to control a conduction time length of the second switch to adjust the amount of water supplied by the water pump.

11. The garment steamer according to claim 10, wherein, the evaporator assembly comprises a heating member and a temperature sensor, the temperature sensor is disposed adjacent to the heating member and configured to detect a temperature of the heating member;

the microcontroller is connected to the temperature sensor; and when the temperature of the heating member reaches a fourth preset temperature, the microcontroller controls the second switch to be conducted to enable the water pump to transfer water from the water tank to the evaporator assembly.

12. The garment steamer according to claim 1, further comprising a step-down module, connected between the power input end and the microcontroller, wherein, the step-down module is configured to reduce an input voltage of the power input end to a voltage suitable for the microcontroller to operate.

13. The garment steamer according to claim 12, wherein, the step-down module is connected to the water pump, the step-down module is configured to reduce the input voltage of the power input end to a voltage suitable for the water pump to operate.

14. The garment steamer according to claim 1, wherein the evaporator assembly further comprises: a heating member, an evaporation chamber, a first receiving member, a second receiving member, and a cover;

the cover is configured to cover a side of the evaporation chamber; and the evaporation chamber, the first receiving member, the second receiving member, and the cover cooperatively define an evaporation sub-chamber.

15. The garment steamer according to claim 14, wherein the heating member is pressure-casted in the evaporation chamber and comprises a first portion and a second portion, the first portion is arranged inside the first receiving member, and the second portion is arranged inside the second receiving member.

* * * * *